United States Patent
Rajput et al.

(10) Patent No.: US 9,773,376 B2
(45) Date of Patent: Sep. 26, 2017

(54) SYSTEM AND METHOD FOR USING CASINO-PRINTED TICKETS TO PLAY CASINO ON-LINE GAMES

(71) Applicant: Bally Gaming, Inc., Las Vegas, NV (US)

(72) Inventors: Yogendrasinh Hematji Rajput, Chennai (IN); Gautam Parameshwar Hedge, Karnataka (IN); Karthik Shyama Udupa, Chennai (IN); Vamsi Krishna Gandu, Chennai (IN); Ravi Subramanian, Chennai (IN)

(73) Assignee: Bally Gaming, Inc., Las Vegas, NV (US)

( * ) Notice: Subject to any disclaimer, the term of this patent is extended or adjusted under 35 U.S.C. 154(b) by 702 days.

(21) Appl. No.: 14/133,520

(22) Filed: Dec. 18, 2013

(65) Prior Publication Data

US 2015/0170473 A1    Jun. 18, 2015

(51) Int. Cl.
*G06F 17/00* (2006.01)
*G07F 17/32* (2006.01)
(Continued)

(52) U.S. Cl.
CPC ....... *G07F 17/3251* (2013.01); *G06Q 20/045* (2013.01); *G06Q 20/18* (2013.01); *G06Q 20/28* (2013.01); *G06Q 20/3224* (2013.01); *G06Q 20/3227* (2013.01); *G06Q 20/3274* (2013.01); *G06Q 20/3276* (2013.01); *G06Q 20/3278* (2013.01); *G06Q 20/34* (2013.01);
(Continued)

(58) Field of Classification Search
CPC .. G07F 17/3251; G07F 17/3218; G07F 17/42; G07F 17/3246; G06Q 20/3224; G06Q 20/4012; G06Q 20/3227; G06Q 20/34; G06Q 20/045; G06Q 20/40145; G06Q 20/3278; G06Q 20/363; G06Q 20/3276; G06Q 20/18; G06Q 20/3274; G06Q 20/28
See application file for complete search history.

(56) References Cited

U.S. PATENT DOCUMENTS

| | | | |
|---|---|---|---|
| 2002/0132666 A1* | 9/2002 | Lind ................. | G07F 17/32 463/42 |
| 2009/0029766 A1* | 1/2009 | Lutnick ............. | G07F 17/32 463/29 |

(Continued)

*Primary Examiner* — Dmitry Suhol
*Assistant Examiner* — Carl V Larsen
(74) *Attorney, Agent, or Firm* — Seed IP Law Group LLP

(57) ABSTRACT

Disclosed is a method for enabling a player to use tickets printed at a casino when the player wants to play games in an on-line casino associated with the land-based casino using a virtual ticket system. The method includes: installing a mobile application for the virtual ticket system on a player's mobile device; registering the player with the virtual ticket system using a mobile number of the mobile device; sending a validation key to the mobile number to validate the mobile device; enabling the player to plays a game on a gaming machine at the land-based casino; after the player has completed game play in the land-based casino, providing the player with an opportunity to create an electronic ticket that is usable in the on-line casino; and enabling the player to engage in game play in the on-line casino using the player's mobile device or a desktop computer platform.

30 Claims, 29 Drawing Sheets

(51) Int. Cl.
- *G07F 17/42* (2006.01)
- *G06Q 20/04* (2012.01)
- *G06Q 20/18* (2012.01)
- *G06Q 20/28* (2012.01)
- *G06Q 20/32* (2012.01)
- *G06Q 20/34* (2012.01)
- *G06Q 20/36* (2012.01)
- *G06Q 20/40* (2012.01)

(52) U.S. Cl.
CPC ....... *G06Q 20/363* (2013.01); *G06Q 20/4012* (2013.01); *G06Q 20/40145* (2013.01); *G07F 17/3218* (2013.01); *G07F 17/3246* (2013.01); *G07F 17/42* (2013.01)

(56) References Cited

U.S. PATENT DOCUMENTS

| | | | |
|---|---|---|---|
| 2009/0131146 A1 | 5/2009 | Arezina et al. | |
| 2009/0328144 A1 | 12/2009 | Sherlock et al. | |
| 2010/0219234 A1* | 9/2010 | Forbes | G06Q 10/02 235/375 |
| 2011/0057028 A1 | 3/2011 | Schwartz | |
| 2011/0070940 A1* | 3/2011 | Jaffe | G07F 17/32 463/20 |
| 2012/0222100 A1* | 8/2012 | Fisk | G06F 21/316 726/7 |
| 2012/0296174 A1* | 11/2012 | McCombie | A61B 5/02427 600/301 |
| 2012/0311322 A1* | 12/2012 | Koyun | G06Q 20/3227 713/156 |
| 2013/0065667 A1 | 3/2013 | Nelson et al. | |
| 2013/0090155 A1* | 4/2013 | Johnson | G06Q 20/18 463/25 |
| 2013/0124413 A1* | 5/2013 | Itwaru | G06Q 20/4012 705/44 |
| 2013/0190077 A1 | 7/2013 | Arezina et al. | |
| 2014/0274306 A1* | 9/2014 | Crawford, III | G07F 17/3218 463/25 |
| 2014/0323206 A1* | 10/2014 | Gagner | G07F 17/3225 463/25 |
| 2015/0012305 A1* | 1/2015 | Truskovsky | G06Q 10/02 705/5 |
| 2015/0065231 A1 | 3/2015 | Anderson et al. | |
| 2015/0087408 A1* | 3/2015 | Siemasko | G07F 17/3248 463/25 |
| 2015/0170473 A1 | 6/2015 | Hematji et al. | |
| 2015/0319613 A1* | 11/2015 | Shmilov | G06F 21/35 726/7 |
| 2016/0071373 A1 | 3/2016 | Anderson et al. | |

* cited by examiner

Mobile Payment Application
Preference Configuration

Player's Club Card

Club Card Number ( Number )

[Cancel] [Save] [Next ▷]

*FIG. 7A*

Personal Information

Player's Name ( First Name )

( Last Name )

Address/Phone Number ( Street Address )

( Street Address 2 )

( City )

( State )

( Zip Code )

( Phone Number )

[◁ Back] [Save] [Next ▷]

Frequently Used Transfer Amounts

Amount to Add

[ $ ]

[Add]

Highlight Default Amount Below:

[ $ ] [ $ ] [ $ ]

[ $ ] [ $ ] [ $ ]

[All] [Other] [Last Cash-Out]

All, Other and Last Cash-Out Amount are populated by default as 7th, 8th and 9th selections ⇐Back [Save] [Next⇒]

FIG. 7F

Authentication

PIN ☐

[Enter PIN]

[Confirm PIN]

Verbal Phrase ☐

[● Record]

Text Phrase ☐

[Enter Phrase]

[Confirm Phrase]

Image ☐

[Select]

⇐Back [Save] [Finish]

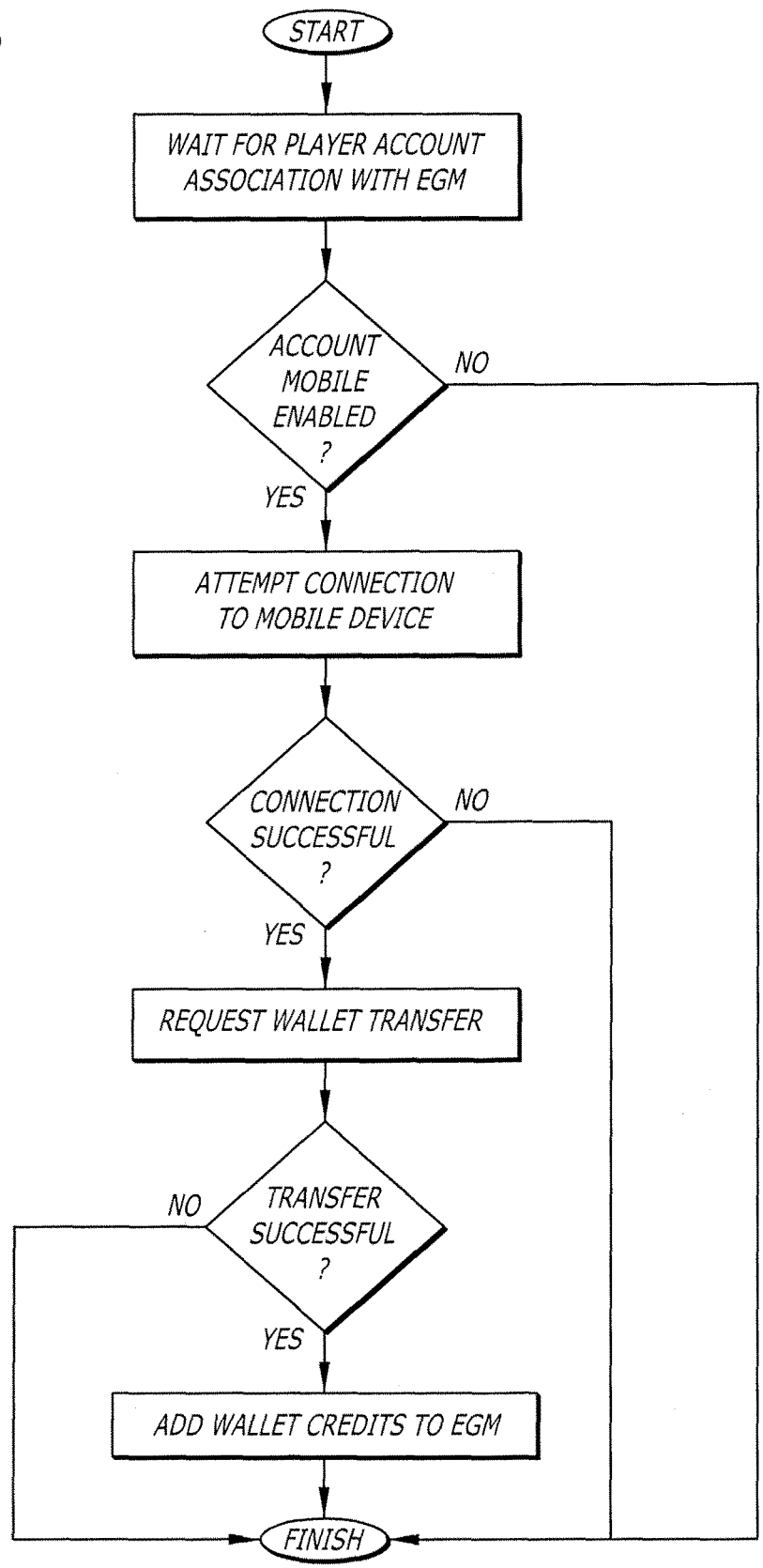

SYSTEM AND METHOD FOR USING CASINO-PRINTED TICKETS TO PLAY CASINO ON-LINE GAMES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The present disclosure is directed to wagering games, gaming machines, networked gaming systems and methods, and in particular to systems and methods for using casino printed tickets to play casino on-line games.

BACKGROUND

In the past, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device. There is also the desire to incorporate mobile devices for game play, however, there are numerous obstacles to the use of mobile devices for game play, including the lack of ticket printers and bill acceptors.

Historically, there has been "Ticket-in-Ticket-Out" functionality in gaming machines. Briefly explained, when using "Ticket-in-Ticket-Out" functionality a player inserts cash into a gaming machine, but does not receive cash when pressing "cash out." Instead, he or she receives a paper ticket that may be further inserted into the present or any other gaming machine, or redeemed for cash by inserting the ticket into a kiosk.

While there is a desire to use mobile devices such as smart phones as gaming devices, there remains the problem that these mobile devices do not have access to traditional gaming peripherals such as ticket printers or bill acceptors. It would be desirable to allow mobile devices to participate in playing games with real money in a casino environment, leveraging existing infrastructure in a way that makes sense to a player. There is a continuing need in the art to address these and other issues.

SUMMARY

Briefly, and in general terms, a method is disclosed for enabling a player to use tickets printed at a casino when the player wants to play games in an on-line casino associated with the land-based casino using a virtual ticket system. The method includes: installing a mobile application for the virtual ticket system on a player's mobile device; registering the player with the virtual ticket system using a mobile number of the mobile device; sending a validation key to the mobile number to validate the mobile device; enabling the player to play a game on a gaming machine at the land-based casino; after the player has completed game play in the land-based casino, providing the player with an opportunity to create an electronic ticket that is usable in the on-line casino; and enabling the player to engage in game play in the on-line casino using the player's mobile device or a desktop computer platform.

In another embodiment, a method is disclosed of associating a mobile device with a kiosk or gaming machine to enable transfer of funds between the mobile device and the kiosk or gaming machine using a mobile wallet application without the use of tickets, ticket printers, or ticket readers. The method includes: providing a kiosk or gaming machine that includes a QR code or barcode reader; displaying a QR code or barcode on the display of the mobile device using the mobile wallet application; in response to prompting, enabling player activation of an association function of the mobile wallet application; reading a QR code or barcode off of the display of the mobile device in response to the mobile device being placed under the QR code or barcode reader; uniquely identifying the mobile device; uniquely identifying a mobile wallet account in a database; and enabling the mobile wallet application to direct funds being withdrawn from the mobile wallet account to be correctly deposited on the kiosk or gaming machine and/or enabling the mobile wallet application to direct funds being added to the mobile wallet account to be correctly withdrawn from the kiosk or gaming machine.

In still another embodiment, a method is disclosed of associating a mobile device with a gaming machine to enable transfer of funds between the mobile device and the gaming machine using a mobile wallet application without the use of tickets, ticket printers, or ticket readers. The method includes: providing a gaming machine that displays a QR code or barcode; in response to prompting, enabling player activation of the association function of the mobile application; capturing a QR code or barcode displayed by the gaming machine using a camera of the mobile device and the mobile application; uniquely identifying the gaming machine; uniquely identifying a mobile wallet account in the database; and enabling the mobile wallet application to direct funds being withdrawn from the mobile wallet account to be correctly deposited on the gaming machine and/or enabling the mobile wallet application to direct funds being added to the mobile wallet account to be correctly withdrawn from the gaming machine.

In yet another embodiment, a method is disclosed of enabling players to use tickets printed at a casino when the player wants to play in the casino's online games using a virtual ticket system. The method includes: redirecting a player to a user interface of the virtual ticket system when the player submits a ticket using a mobile gaming platform or a desktop computer platform; sending actions from the user interface to a mobile application that enables the player to submit a ticket by scanning a physical ticket, uploading a ticket image, providing a ticket number, or receiving a ticket via Wi-Fi from a gaming machine, a mobile gaming platform, or a desktop computer platform; receiving ticket information from a ticket; validating the ticket in an internal database using the associated ticket information; if the ticket is password protected, prompting the player to provide a password; communicating with the virtual ticket system to confirm ticket validity; confirming and validating a player card's PIN number, if a player is scanning a ticket for a first time; and transferring a redeemed amount to the player's account on an on-line gaming platform of the casino.

Features and advantages will become apparent from the following detailed description, taken in conjunction with the accompanying drawings, which illustrate by way of example, the features of the various embodiments.

BRIEF DESCRIPTION OF THE DRAWINGS

Figures 7C, 7D:
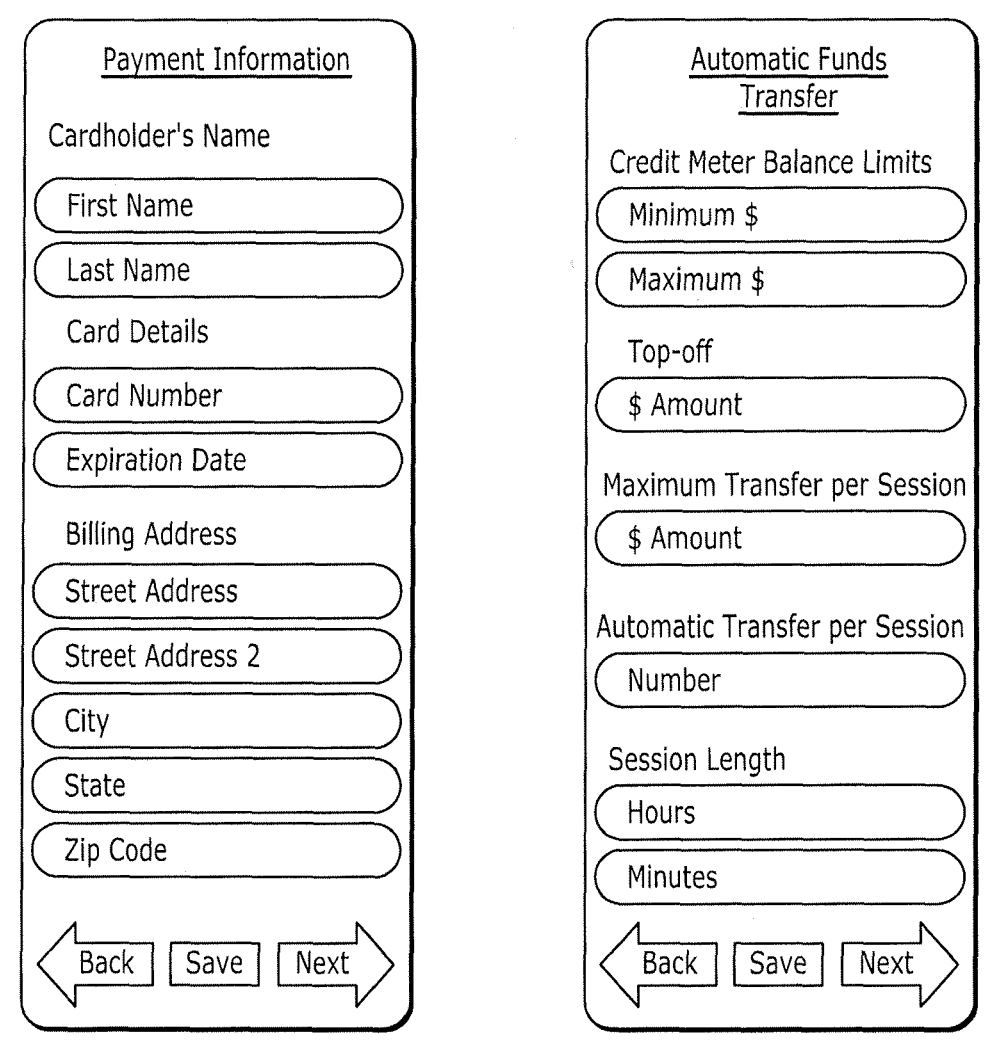

FIGS. 7A-7F illustrate example displays on a mobile device.

FIG. 8 illustrates a CMS process to transfer the wallet to the EGM.

DETAILED DESCRIPTION OF PREFERRED EMBODIMENTS

Figure 1:
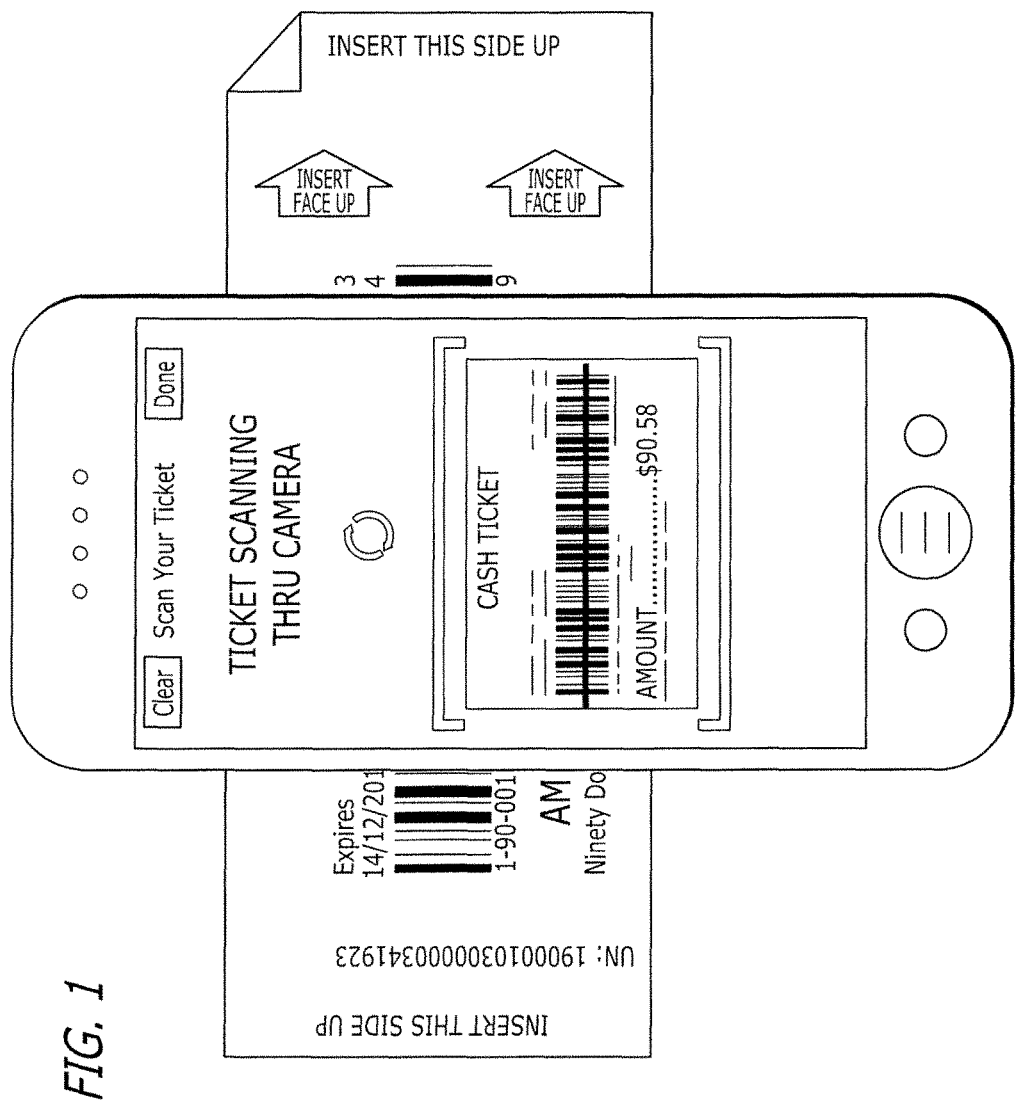
FIG. 1 illustrates a mobile camera being used to scan a regular casino printed ticket.

Various embodiments are directed to a game, gaming machine, gaming systems and method for playing a game, wherein the gaming system includes a Virtual Ticket System that uses casino printed tickets to play casino on-line games via a mobile device. The embodiments are illustrated and described herein, by way of example only, and not by way of limitation. Referring now to the drawings, and more particularly to FIGS. 1-30b, there are shown illustrative examples of games, gaming machines, gaming systems and methods for playing a game in accordance with various aspects of the gaming system which includes a Virtual Ticket System that uses casino printed tickets to play casino on-line games via a mobile device.

Figure 2:
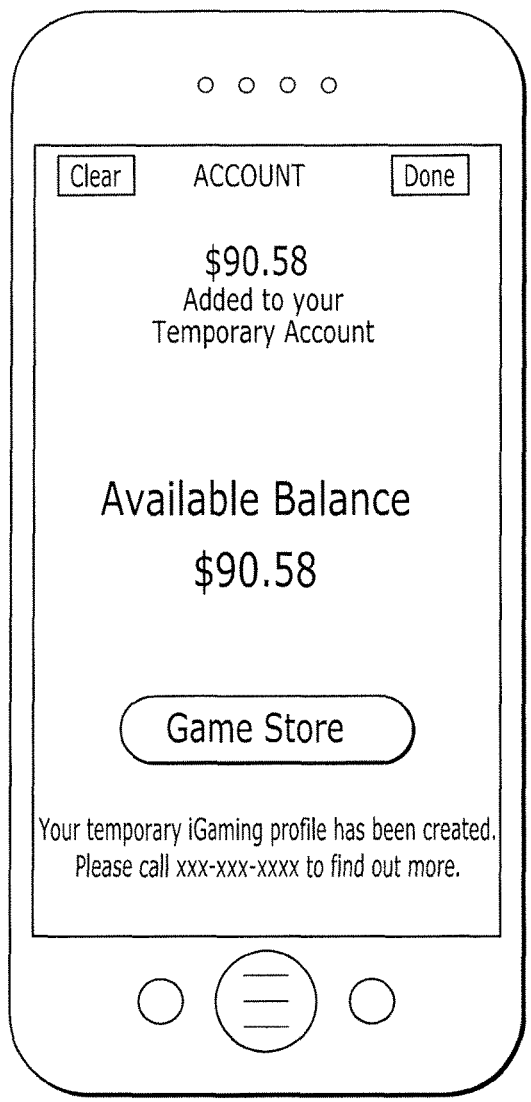
FIG. 2 illustrates a mobile device being used to create a temporary profile for the player and ticket amount added to an iGaming profile.

Using Printed Tickets to Fund On-Line Casino Gaming:

Referring to FIGS. 1 and 2, an embodiment of the Virtual Ticket System enables players to use tickets printed at a casino when the player wants to play in the casino's online games. In one embodiment, the player receives a ticket with a Barcode/QR code that may be scanned by the casino's mobile application of the Virtual Ticket System. The amount/promotional credits on the scanned ticket may be used to play games online. The employment of this embodiment extends a player's association with a casino's system beyond just the casino's property itself.

With the advent of internet-based gaming, land-based casinos may extend their presence to online space as well. In one such embodiment, a player may play in an online version of a game at a casino, and then visit the actual casino premises (play on the slots) and continue to play in the online casino. In this embodiment, a player can expect to have an experience that extends his online play to a casino and his casino play to an online experience.

The above-described experience may be created for a carded player, since all of the transactions may be electronic. In one embodiment, a common account may be used between a land-based casino and the online casino. A player can access his account whether he is playing in the online space or the land-based space of the same casino. However, when the player is an uncarded player, the player will use currency and tickets. Accordingly, for the uncarded player, playing in the online version of a casino game playing the land-based version of a casino game are independent experiences. Therefore, in some embodiments of the Virtual Ticket System, a power ticket system is implemented which makes the player's experience seamless.

In the following scenario that employs the power ticket system, a player may extend play from a casino to an online game. In this embodiment, the casino name is CasinoABC. At CasinoABC, a player installs a CasinoABC mobile application for the Virtual Ticket System on his smart phone. This mobile application is a power ticket mobile application customized for CasinoABC. After installing the power ticket mobile application, the player registers himself with the power ticket system using his mobile number. In one embodiment, the power ticket system sends a validation key by SMS to the player's number to validate the mobile number (SMS code validation). Normally, tickets printed from gaming equipment (slots, tables, and the like) have a bar code. In some embodiments, the ticket number may be printed as a QR code as Continuing, in this embodiment, the player plays at CasinoABC. At the last gaming machine that the player plays in the land-based casino, the player has the opportunity to create an electronic ticket that may be used in the online casino later. The player may take this action in the following ways: (1) Using a camera, (2) a wireless ticket transfer; and (3) a password-protected ticket. When using a camera (e.g., of a smart phone), the player opens the CasinoABC mobile application and scans the printed ticket. The mobile application interprets the ticket image and reads the bar code and/or the QR code. When using a wireless ticket transfer system, instead of printing and scanning the ticket, the player reads the ticket into his smart phone using a wireless communication with the electronic gaming machine (EGM). Any wireless technology (e.g., NFC, RFID, Bluetooth, or the like) may be used. When using a password protected ticket, the ticket may employ a password/PIN-type of protection. For example, in one embodiment, if the ticket is associated with the player card (i.e., the ticket was printed from an EGM where the player was carded), the ticket may ask for the PIN number of player card to authorize the ticket amount to be uploaded into the mobile application.

In some embodiments, the Virtual Ticket System uses a CAPTCHA (Completely Automated Public Turing test to tell Computers and Humans Apart) and/or a SMS code validation to tackle automated/brute force attacks, which ensures that an individual does not improperly scan and upload an invalid ticket. Additionally, the power ticket mobile application may send the details of the ticket along with the mobile number to the power ticket system to ensure that there is no duplicate redemption of power tickets. This power ticket system stores the ticket number along with the mobile phone number/device ID. Furthermore, the power ticket system maintains the database of power tickets along with their mobile numbers. Accordingly, there may be only one association between the ticket number and the mobile number. This ensures that another smart phone that has a copy of the same ticket cannot redeem the ticket.

After scanning and uploading the information from a ticket using any of the above-described methods, a player now has the electronic version of the ticket on his mobile phone in a ticket wallet using the Virtual Ticket System (e.g., CasinoABCTicketWallet). In one such embodiment, the power ticket details along with mobile phone number reside in the database of the power ticket system. In this scenario, the player exits the land-based casino. Next, the player engages in game play on the online version of CasinoABC. The Player may engage in game play using his smartphone or a desktop system.

When the player invokes the CasinoABC online casino, the player transfers money to his online profile (either temporary or permanent). When the player plays on the smartphone, the CasinoABC's online gaming platform provides an interface to read the ticket from the CasinoABC TicketWallet. When the player plays on the desktop, the CasinoABC's online gaming platform on the desktop provides an interface to read the ticket from the ticket wallet on the mobile phone to the online platform. In some embodiments, the interface may be a wireless interface such as Bluetooth, or NFC.

In one embodiment, after the online platform reads the ticket from the CasinoABC TicketWallet on the smartphone, the online platform validates the ticket by sending the ticket details to the casino's power ticket server. The CasinoABC TicketWallet provides the phone number to the online platform. Regarding the power ticket server, the power ticket server may check to determine if the ticket has come from the source from which it was created. This is done by checking the mapping between the ticket number and the mobile number recorded when the ticket is created on the phone. If the source is the same, then the power ticket system sends the ticket details to the main ticket server which validates the ticket and redeems the ticket. After the ticket server validates the ticket, the power ticket system transfers the amount on the ticket to the player's iGaming profile. In this manner, the ticket on the casino's ticket server is redeemed. CasinoABC online games are now available for the player.

After the player has completed the game play on the CasinoABC online portal, the player may want to continue game play in the CasinoABC land-based premises. As described below, game play may be continued from an online portal to a land-based casino. In one embodiment, when the player cashes out from the CasinoABC online platform, the money left on the game is transferred to the player's iGaming profile. The iGaming/RGS is responsible for implementing a "geographical fencing" technique to validate the geo-location player that is accessing the game. For example, CasinoABC online platform provides a feature to create an electronic ticket. If the player chooses to create the electronic ticket, the CasinoABC online platform contacts its land-based power ticket system, which in turn talks to the main ticket server. Next, a ticket is created in the CasinoABC main ticket server. Continuing, the power ticket system maps the ticket number and the phone number in its database. Then, the details are communicated to the iGaming platform.

After the electronic ticket is received by the iGaming platform, at the player's request, the iGaming platform transfers the electronic ticket to the player's smartphone. This may be performed using a wireless technology such as Bluetooth, WiFi, and NFC. The transferred ticket is in the CasinoABC TicketWallet of the player's smartphone. At the casino, the electronic ticket on the smartphone may be redeemed at the gaming machine if the gaming machine supports an interface to read the electronic ticket from the mobile phone. In this embodiment, the gaming machine reads the ticket details from the phone and sends it to the power ticket server for validation. The power ticket server validates the ticket source by comparing the mobile phone number for the ticket in its database. If it is the genuine ticket, the power ticket server sends the ticket to the ticket server. The ticket server then validates the ticket, redeems the ticket, and communicates the status to the power ticket system, which transfers the funds to the gaming machine. When the ticket is redeemed, the redeemed amount is deposited into the gaming machine.

Accordingly, the above scenario explains how an uncarded player may play on the online version of a casino and a land-based version of a casino. Of course, a carded player also can avail the same features for redeeming tickets between land and online casinos.

Figure 3:
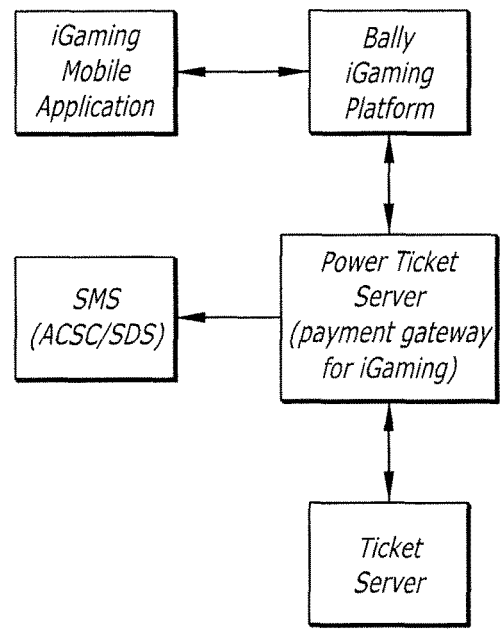
FIG. 3 illustrates a logic flow diagram of an iGaming process.

Referring now to FIG. 3, additional aspects are discussed of an embodiment of the Virtual Ticket System, which enables players to use tickets printed at a casino when the player wants to play in the casino's online games. In one aspect, the Virtual Ticket System uses power tickets, which are as secure as regular tickets. In another aspect, ticket details can be sent as an SMS/E-mail or password-protected web link. This is useful when a power ticket is used as a gift from the casino to a player or a player to a friend. In still another aspect, if the ticket has a QR code, a camera mounted on a gaming machine may be used to read the ticket number and redeem.

In yet another aspect of the Virtual Ticket System, rechargeable tickets are used. In this manner, existing tickets may be recharged from a credit card or bank account, or by scanning other tickets (e.g., scan to merge) or an external mobile wallet account supported by iGaming platform. Continuing, in some embodiments, a power ticket may be created without a physical ticket. In such an embodiment, the ticket server contains all of the ticket creation information; however, it can be transparent to the ticket server whether the ticket was printed on paper or whether it was generated electronically.

In another aspect of the Virtual Ticket System, a power ticket may be a promotional or non-cashable ticket (like a regular ticket). If a power ticket is a promotional ticket to play only a particular game, the Ticket may contain a QR code as a link to download that game to a mobile device. Continuing, a power ticket may have a QR code as a web link to an RGS (internet gaming) or a link to download the RGS application.

In still another aspect of the Virtual Ticket System, the power ticket provides benefits to casino players, casinos themselves, and gaming machine manufacturers. For example, a power ticket benefits a player since the player doesn't need any account with the casino to play at both a land-based casino and an online casino. The power ticket benefits the casino by: (1) enabling an uncarded player to be attracted to both land-based casinos and online casinos; (2) extending relationships with player to a casino's system beyond their casino property, which may help the casino to attract players back to casino property; (3) extending the TITO (Ticket in Ticket Out) beyond a casino property; (4) implicitly promoting a casino's online system; and (5) seamlessly integrating with the casino's existing system. Finally, the power ticket system benefits the gaming machine manufacturer by enabling the integration of land-based and online gaming systems.

Continuing, the power ticket aspect of the Virtual Ticket System also provides (1) the ability to scan a ticket from a mobile camera or Wi-Fi to cash-in; (2) the ability to reuse the existing ticketing system to enable mobile and internet gaming and integration with the iGaming System; (3) the ability to store the ticket in electronic form on a mobile device; and (4) the security implementation for this system.

In another aspect of the Virtual Ticket System, the iGaming mobile application (or desktop application) is responsible for functionalities like scanning tickets, as well as other iGaming functionalities. In still another aspect, power ticket server is a payment gateway for an iGaming Platform. The iGaming Platform uses a payment gateway to redirect the player's user interface to a payment gateway and receive transaction details from the payment gateways.

In some embodiments, the power ticket server is responsible for multiple functions. Specifically, the power ticket server behaves as a payment gateway of the iGaming Platform and manages fund transfer into the right bucket (cashable/non-cashable/promotional, and the like) from/to the iGaming Platform. Additionally, the power ticket server stores active/inactive Power Tickets and audit-related information. The power ticket server also stores basic player information, a card number and mobile number, as well as storing passwords for password protected tickets and web tickets. Further, the power ticket sever enables power tickets that are not bound to a particular user. This is useful when the player chooses to gift a power ticket to his friend. If a power ticket is not unbounded and the ticket was generated from a gaming machine with the player carded-in (or any other way Ticket Server knows player for ticket), the power ticket may not allow ticket redemption.

Continuing, the power ticket server implements security like CAPTCHA, SMS code verification, and the like. This security also includes blocking a particular mobile number/player based on security rules. Additionally, the power ticket server implements functionalities for creating and sending a power ticket via an email or a password-protected web link. In such an embodiment, once the password is validated, the ticket image is shown to the player. This image can be saved by the player on his device/desktop. Moreover, the power ticket server may implement functionalities for scanning barcode tickets, communicate to the ticket server to create/redeem a regular ticket, and communicate to SMS (like ACSC or SDS) to validate the player's PIN. In this manner, the power ticket server validates this only once to connect an iGaming account, mobile number, and Player Card (i.e., CMP account).

In one embodiment, the logic flow for a ticket amount transfer to an iGaming account is described as follows. Once the player chooses to insert a power ticket using the mobile/desktop, the iGaming Platform redirects the user interface to the power ticket server. Next, the power ticket server sends the user interface actions to the mobile/desktop application that enables the player to receive the ticket through the following steps: (1) scanning the paper ticket, (2) uploading the ticket image, (3) providing the ticket number, and (4) receiving a ticket via WiFi over another supported system, such as a gaming machine or a mobile/desktop platform. Once the ticket information is received, the power ticket server validates the ticket in an internal database if the ticket is password protected. If the ticket is password protected, the player is prompted to provide a password. Continuing, the power ticket server then communicates with the ticket server to see if the ticket is valid. If the player is scanning the ticket for the first time, and the ticket server has information about the player for the ticket, the power ticket server confirms and validates the player card's PIN number from SMS (unbounded tickets are the exception). If the ticket is valid, the power ticket server informs the ticket server that the ticket is redeemed. Finally, the redeemed amount is transferred to the player's account on the iGaming Platform. Notably, if the player doesn't have an iGaming account, then the iGaming Platform provides anonymous account creation.

In another embodiment, the logic flow for ticket generation by the power ticket server is described as follows. First, the player chooses to purchase a ticket using the power ticket server for various purposes including gifting to a friend visiting a casino. In another aspect, the casino may want to send a non-cashable (or cashable only inside the casino) power ticket to a player in order to attract the player to the casino. In one such embodiment, the power ticket server generates communications to the ticket server and feeds information to enable generating a ticket by the ticket server. This information is also stored in the power ticket server database. Notably, the ticket creator (e.g., player or casino) may choose to password protect the ticket. Additionally, the ticket creator may choose the delivery medium (SMS/MMS, mail, password/pin-protected web links) for a ticket. Notably, the power ticket server delivers the ticket information as a ticket created choice.

In still another embodiment, the logic flow for the ticket amount transfer to a gaming machine is described as follows. First, the player has received a ticket on a mobile platform which he wants to cash in at a gaming machine. In such a scenario, the player opens the iGaming mobile application, opens the power ticket server's wallet, and chooses the tickets to transfer. Next, the player uses a user interface on the gaming machine to indicate that the player wants to transfer a Power Ticket to the gaming machine. At this point, the gaming machine turns on the receiving medium (e.g., camera, Wi-Fi, NFC, or the like). The player then uses that medium to deliver ticket information to the gaming machine. Finally, the gaming machine uses regular flow to receive ticket information and receive the ticket amount.

Figure 4:
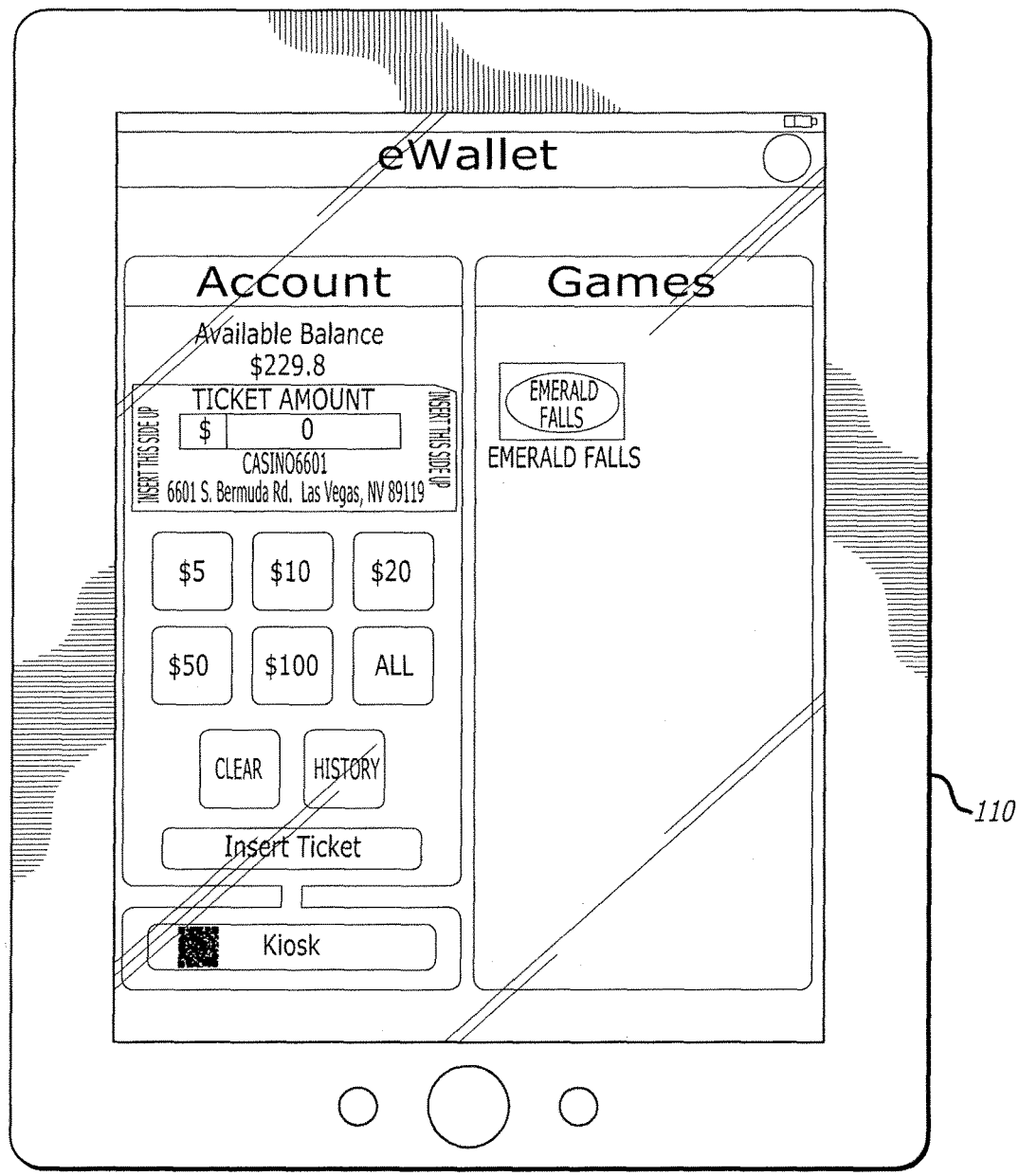
FIG. 4 illustrates an embodiment of the Mobile Wallet application.
Figure 5:
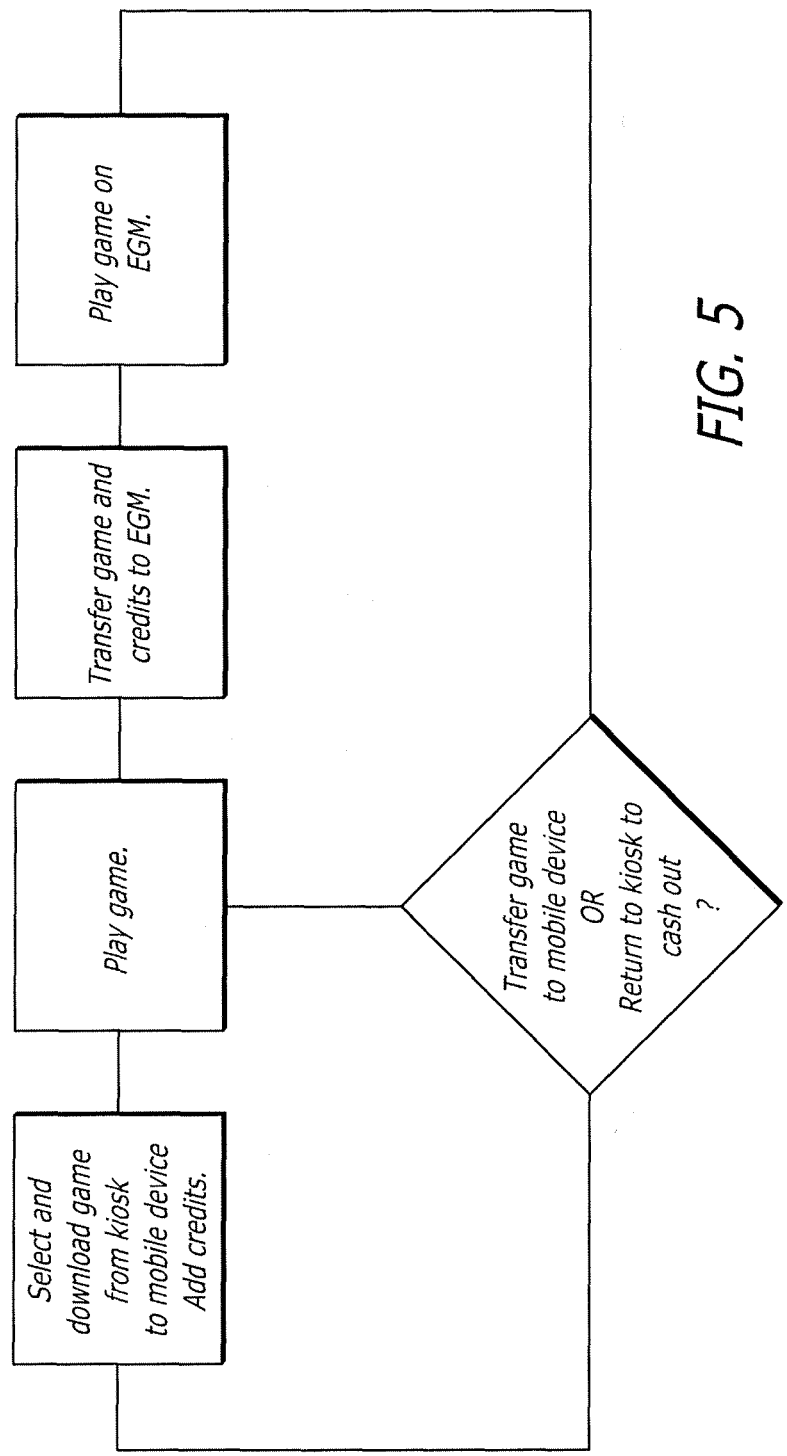
FIG. 5 illustrates a player's perspective of the operation of one embodiment.
Figure 6:
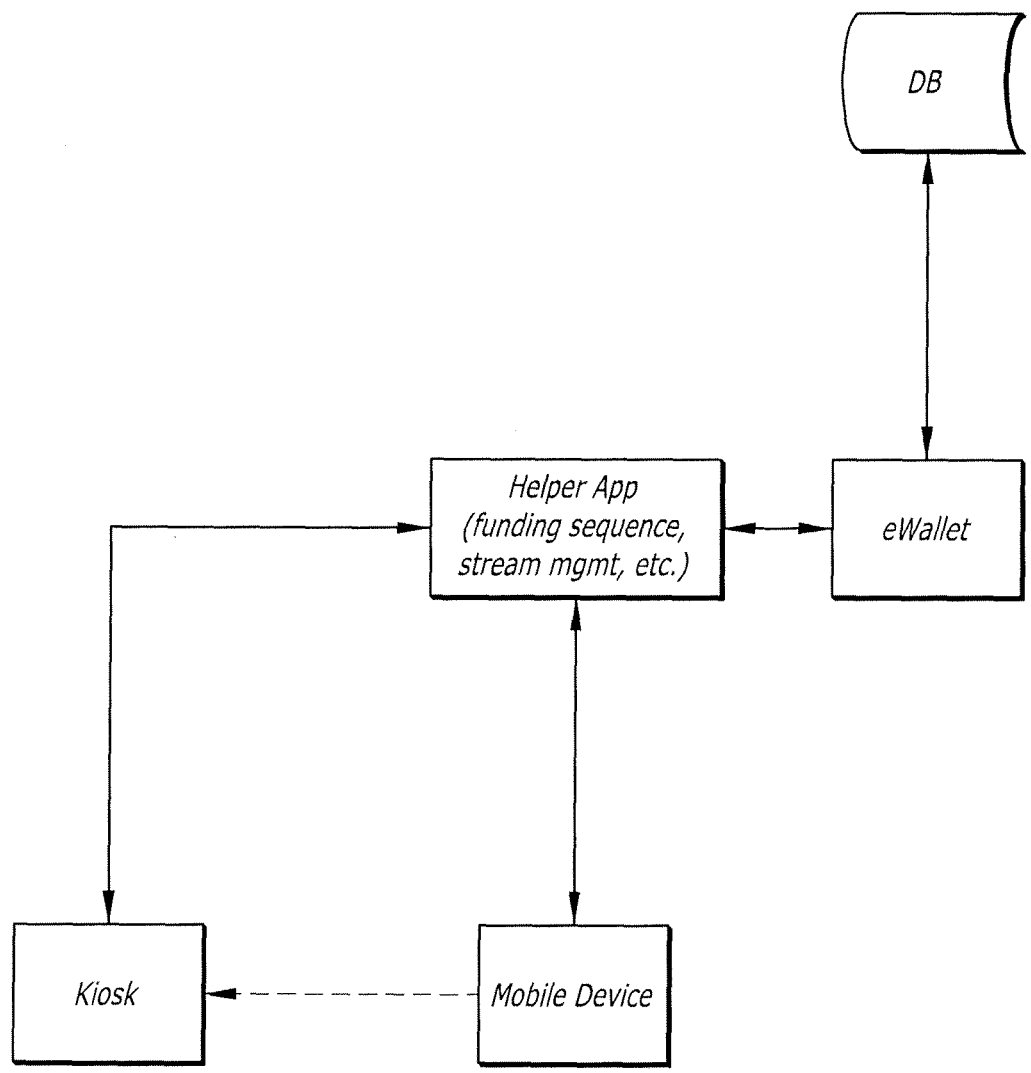
FIG. 6 illustrates a system overview.

The Mobile Wallet:

Referring now to FIGS. 4-6, some embodiments of this Virtual Ticket System enable players to transfer funding between electronic gaming machines, mobile devices, and paper tickets, as well as cash/credit cards, as shown in FIG. 4.

In one embodiment of this Virtual Ticket System, the mobile device 110 acts (from the player's perspective) as a mobile wallet. However, in the actual implementation and functionality, the mobile device 110 does not store the funds. These financial transactions are stored in a database on a server. The mobile device 110 must therefore have network connectivity to be functional. This is a configuration that may be achieved through the use of smart phones and the ubiquitous nature of network infrastructure, such as 3G or WiFi mobile phone networks. In one embodiment of the Virtual Ticket System, the mobile device 110 also has a rear-facing camera that is capable of acquiring QR codes or barcodes. Specifically, FIG. 5 illustrates how a player may interact with the Virtual Ticket System.

In one embodiment of the Virtual Ticket System, the mobile wallet is configured to interface with via an application that is loaded onto the mobile device 110 (as well as on kiosks and EGMs 130). According to one embodiment, FIG. 6 shows how this helper application interacts with other elements of the Virtual Ticket System, such as kiosks and EGMs 130.

In another embodiment of the Virtual Ticket System, security levels are utilized for identification and/or authentication during the association process. These security components include identification and/or authentication of the device ID of the gaming machine and mobile device, the user name of the player, and the password of the player. In some embodiments of the Virtual Ticket System, biometrics are used to assist in the security efforts of the employed to access the mobile device and the player's financial account. In such an embodiment, a biometric reader may be used which may take a variety of forms; for instance, a fingerprint reader, iris scan, microphone and voice recognition software, hand vein pattern detection, or combinations thereof. In alternate embodiments, a player's written signature may be digitized and verified against a signature database. For example, a player may sign on a surface computer display with a finger or stylus. Biometric analysis may be performed at the gaming system (e.g. table or arcade-style gaming systems) or may be performed by a remotely-located remote computer system.

Also, for example, a player's identity and proximity may be detected by the sensor subsystem or other subsystem of the gaming system. For instance, a transponder carried by a piece of media or a wireless communication device which is carried by or otherwise associated with a player may be wireless detected via wireless interrogation. The piece of media may take any of a variety of forms, for instance a loyalty program card, driver's license, credit, debit or prepaid card. Proximity data acquired by the gaming system may, for example, include a location in the casino (e.g., x, y, and z coordinates or GPS data). The gaming system or some other system may associate the proximity data with a player identifier. Based at least in part on the location coordinates, the system may create a logical relationship between the player identifier and a particular gaming system, a table identifier, a seat identifier and/or a player position identifier.

A player may identify himself or herself at the gaming system by placing a piece of media (e.g. loyalty program or player club card, driver's license, credit, debit or prepaid card) on the playing surface. A sensor subsystem may read the media, and a CMP/CMS system may identify the player from the read information. The display subsystem may display indicia representing cash and/or point balances on one or more accounts associated with the player. The player may employ a user interface to transfer funds from his account, for example, to a credit meter of the gaming system or as virtual chips. The transfer may require entry and approval of a personal identification number (PIN), biometric data, and/or password. The user interface may include one or more user selectable icons displayed on or below the playing surface, or some separate device such as a PIN pad, keypad or keyboard, for example located at each seat. Transfers may employ appropriate security protocols and encryption, for example AFT or WAT transfer protocols of SAS or the GSA G2S class, respectively.

In some embodiments, the Virtual Ticket System facilitates wireless transfer of funds from a personal computing device and/or a wireless communication device capable of performing funds transfer using the Mobile Wallet inside the device, from a remote financial institution, or from other points or cash funds account. Personal computing and/or wireless communication devices may take a variety of forms, for example a cell phone, APPLE iPhone device, SAMSUNG Galaxy device, personal digital assistant (PDA), laptop computer, BLACKBERRY, TREO and other such devices. The device may establish wireless communication with the table or arcade style gaming system or with a casino player account. Funds may be debited from or credited to the device or a remote financial account. The communication protocol may take a variety of forms, for example, Bluetooth or Wi-Fi, but other standard networking protocols are envisioned as long as the protocols support security via authentication and/or encryption of the transmissions and transactions.

Referring now to FIGS. 7-12, a TITO (Ticket-In-Ticket-Out) system may be utilized. The TITO maybe partially or eventually be completely replaced by a mobile phone application for the Virtual Ticket System that is operated by the player on their own personal mobile phone. The player typically installs this application for the Virtual Ticket System on their phone by receiving and activating a link to a URL supplied by the casino. For example, this link may take the form of a printed QR code or be contained in email promotions.

FIGS. 7A-7F show examples of how the player may configure the mobile application for the Virtual Ticket System when installed. First, the player associates the phone with a player card number. This enables the CMS to link the phone to card-in and card-out events at a particular EGM.

Secondly, after entering personal details, the player may configure rules for the transfer of funds to EGMs. The player may associate an existing bank account or a 3rd party wallet (such as Paypal or Google Wallet) with the phone application as sources of funding. Further, the player may set rules as to when funds may be automatically transferred (e.g., when credits reach a minimum). They also may set harm minimization rules (e.g., ending sessions after a period of time or limiting the amount transferred during a session). A player may also set a maximum amount on the EGM credit meter. If the player is successful in his gaming session, and hits a win that takes them over the maximum credit meter, his excess funds may be immediately transferred back into the phone wallet. A player may also set up frequently used transfer amounts, or he may preferably be populated with standard amounts such as $20, $50, $100 and $200. Finally, a player may set his preferred authentication method, be it PIN, facial recognition, password or even none.

Once installed and configured, the mobile application for the Virtual Ticket System may be enabled for "push notifications." This is a class of signals that is supported by all major phone platforms. A push notification is a signal that causes the application to become active, and can be sent over the internet. Once active, the application may communicate with a server interactively. In this embodiment, the server is connected to the casino CMS.

After a player has installed the mobile application for the Virtual Ticket System, the player may then go to the casino and insert his player tracking card into an EGM as normal. At this point, the processes for the Virtual Ticket System shown in FIG. 8 (server) and FIG. 9 (mobile device) are performed.

Looking at the server side of one embodiment of the Virtual Ticket System, inserting the player tracking card associates a player with the gaming machine. This embodiment is not limited to just player tracking cards. Using previously disclosed embodiments, such as "mobile tickets," a player may also associate his wallet or phone with the gaming machine by scanning a QR code attached to the gaming machine or gaming machine display, or by other means such as Bluetooth communication, Indoor Positioning Systems or biometrics such as facial recognition.

Figure 9:
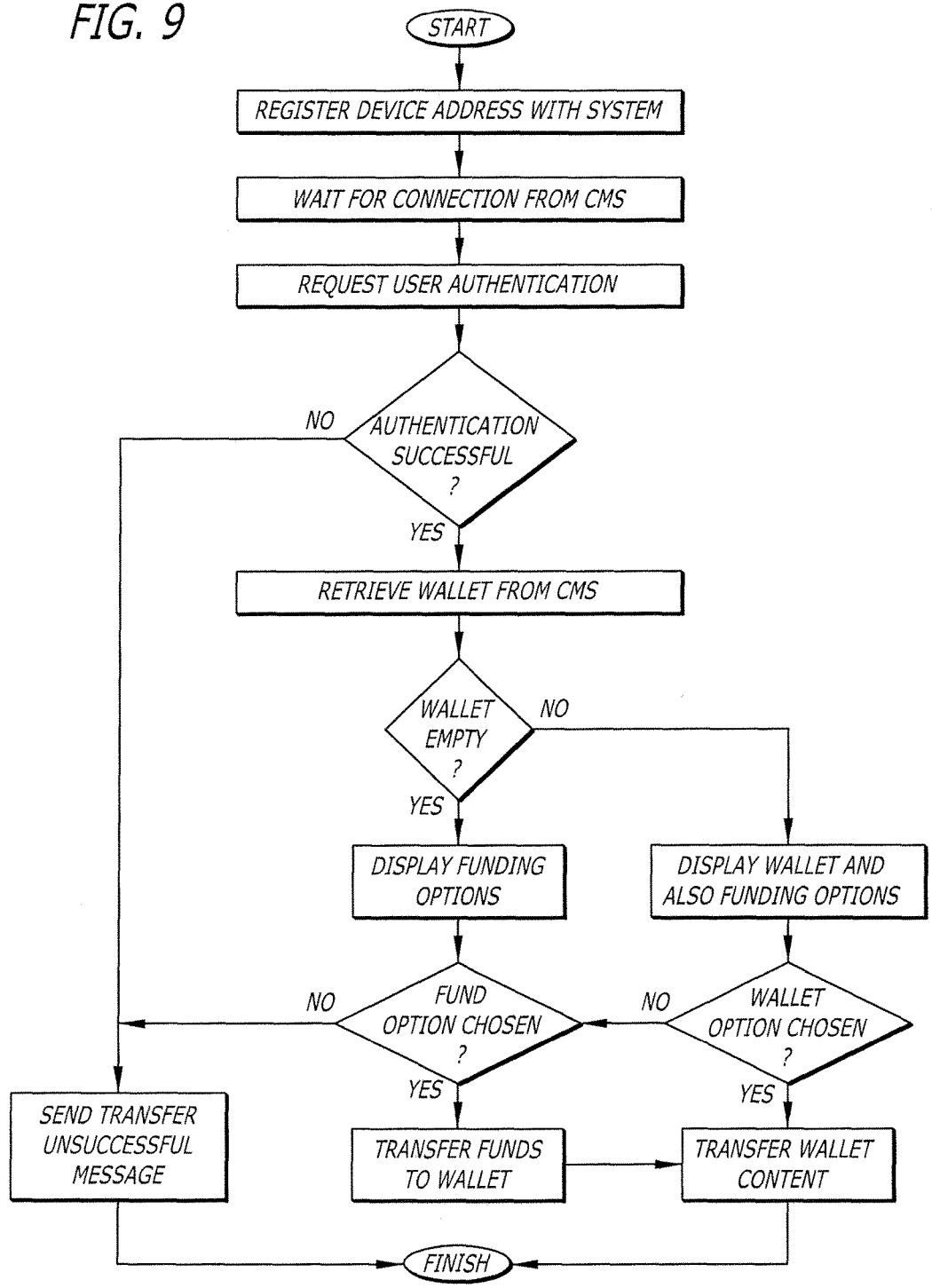
FIG. 9 illustrates a mobile device process to transfer the wallet to the EGM.
Figure 11:
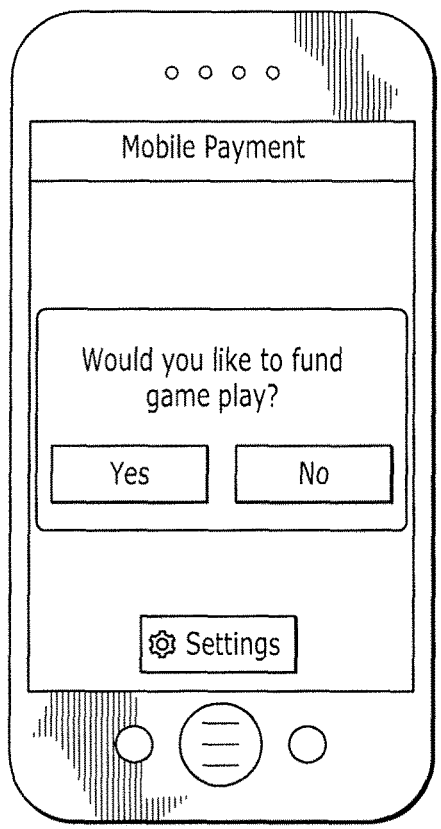
FIG. 11 illustrates a display of a mobile phone at an initial connection.

If the player tracking account indicates an active mobile phone is linked to the account, the CMS sends a push notification to the phone. If this is successful, a transfer is requested from the wallet. The process of the Virtual Ticket System now moves to the mobile device as shown in FIG. 9. Specifically, the push notification causes the mobile application to become active. Preferably, the phone generates an audible or vibratory signal to the player, and displays a screen such as shown in FIG. 11.

Figure 12:
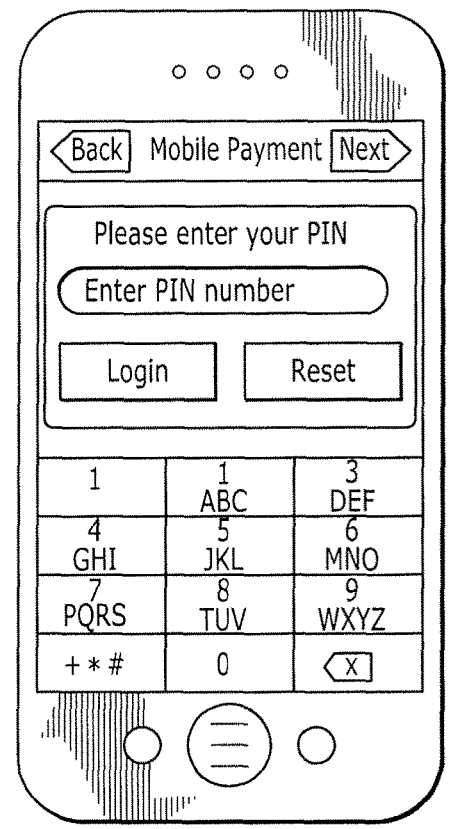
FIG. 12 illustrates an example security protocol for a mobile payment.

If the player chooses to fund the gaming machine from the phone, then the player is optionally presented with an authentication screen, such as shown in FIG. 12. Alternatively, or additionally, authentication may take place at the actual execution of transfer of funds described below.

Once authenticated, the mobile device retrieves the wallet status from the casino-hosted wallet server (the mobile wallet). If a player has existing funds in his mobile wallet, these existing funds are presented to the player with the option of transferring these funds directly to the gaming machine. If the player has no funds in his mobile wallet, he may be presented with an option to transfer funds from an external source (e.g., Paypal, Google Wallet or a bank account). The amount of funds to transfer may be chosen from a set of fixed amounts (as configured initially) or from a chosen arbitrary amount. This option may also be provided if funds are available in the mobile wallet. For example, if a player had, $12.13, in their mobile wallet, the player may elect to transfer this amount plus a further $20.00 from an external source.

If external funds are transferred, further authentication may be required through the external funding source. Alternatively, such authentication credentials may be cached in the mobile application, provided that this function is desired by the player. In one embodiment of the Virtual Ticket System, the external funds, if sourced, are first transferred into the mobile wallet and then along with any mobile wallet value, are passed to the CMS for transfer to the gaming machine.

Once received at the CMS, the wallet value is transferred to the gaming machine. A legacy gaming machine typically only sees this as an AFT (Automated Funds Transfer) transfer from the CMS. The gaming machine does not see any information or data regarding the mobile phone transactions.

Figure 10:
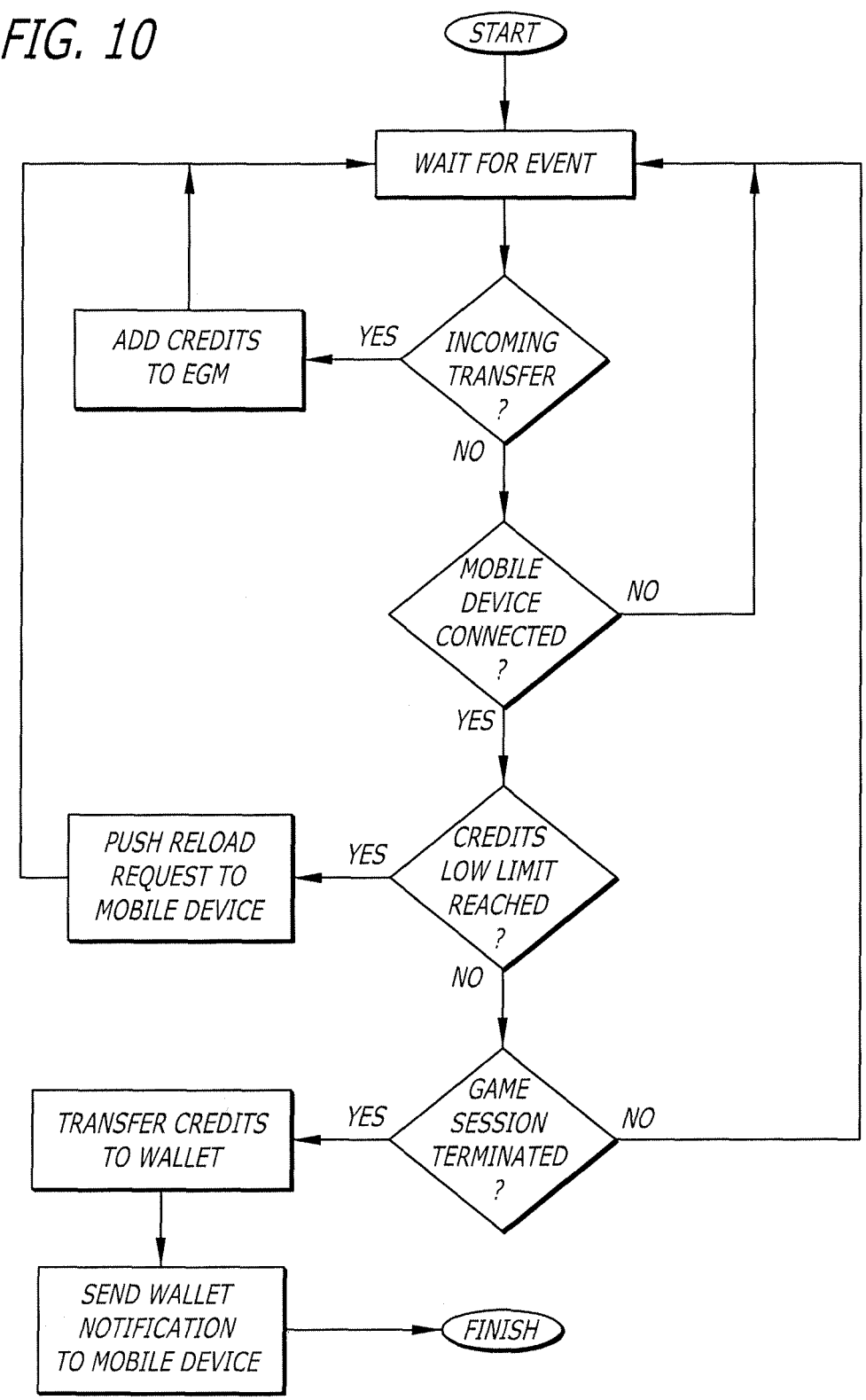
FIG. 10 illustrates ongoing transactions during a gaming session.

This transaction using the Virtual Ticket System is very simple for a player to navigate. Furthermore, this transaction requires no extra infrastructure at the casino end beyond an internet gateway accessible by the mobile phone. During game play, further transactions may take place. Some examples are shown in FIG. 10. For brevity, these examples are not exhaustive. Other possible transactions include, for example, harm minimization scenarios or excess fund removal.

In one embodiment of the Virtual Ticket System, the CMS or iView monitors events from the gaming machine. Further incoming or outgoing transfers may be manually initiated by the player by using the mobile application of the Virtual Ticket System. In the case of outgoing transfers, the CMS may periodically update the mobile application with the current credit level on the gaming machine. If a player initiates a transfer of all credits off the gaming machine, the session is ended and the credits are transferred to the mobile wallet either by the mobile application or CMS. At a later point (or immediately if the rules are appropriately configured on the mobile device) some or all of these funds may be transferred to the player's preferred funding source.

If a low (or high) credit limit is reached, a push notification is sent to the mobile device requesting (or sending) funds. In one implementation, the mobile device does not need to ask for further authentication at this point, but may ask to confirm the amount of transfer.

If the player presses a "cash out" button or removes the player tracking card from the gaming machine, the credits are automatically transferred by the CMS or iView to the mobile wallet. A push notification is sent to the mobile device so that the player is aware of this transfer. Furthermore, rules on the mobile application may then be acted upon to transfer some or all of these funds back to the funding source.

All transactions may be repeated when a player goes to another gaming machine and inserts their player tracking card. Authentication may be optional at this point, as long as a timeout period has not been met. If a timeout period has been met, then re-authentication should be mandatory. In one embodiment of the Virtual Ticket System, the player must opt-in for automatic authentication. In another embodiment, the default setting is for authentication at the beginning of each insertion of a player tracking card into a gaming machine. The purpose of this protocol is to ensure that a stolen mobile phone cannot be used to fund a gaming machine.

Funding Game Play Using the Kiosk:

Another embodiment of the Virtual Ticket System facilitates a kiosk to be used to enable a player to add or release funds from their play game. This is performed in a manner somewhat similar to a conventional Ticket-In-Ticket-Out (TITO) system, but without the use of tickets, ticket printers, or ticket readers. The kiosk does not require a ticket printer (or bill validator) for other funding sources, such as credit cards, debit cards, and the like.

Figure 13:
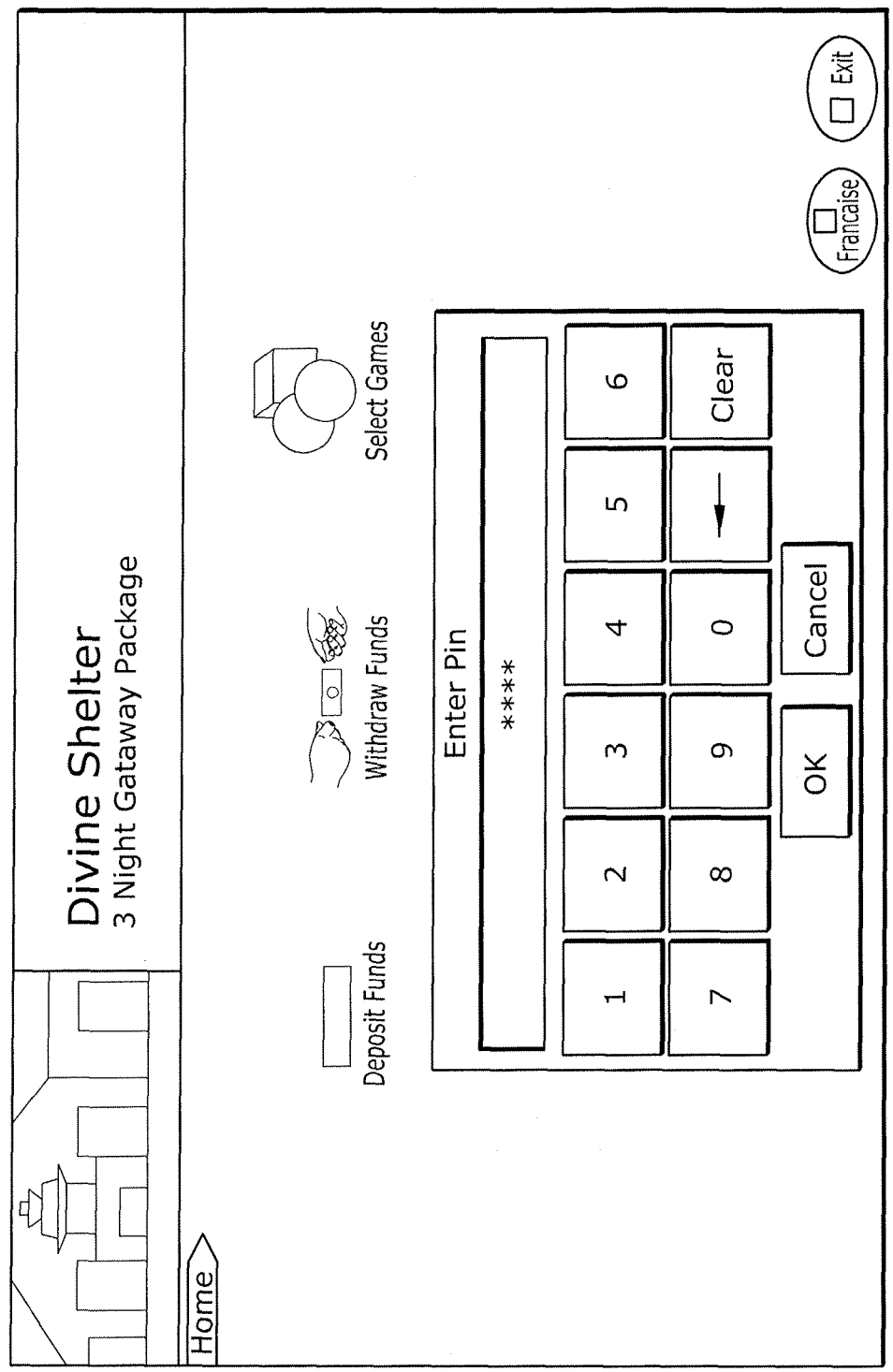
FIG. 13 illustrates an example of a Kiosk implementation.
Figure 14:
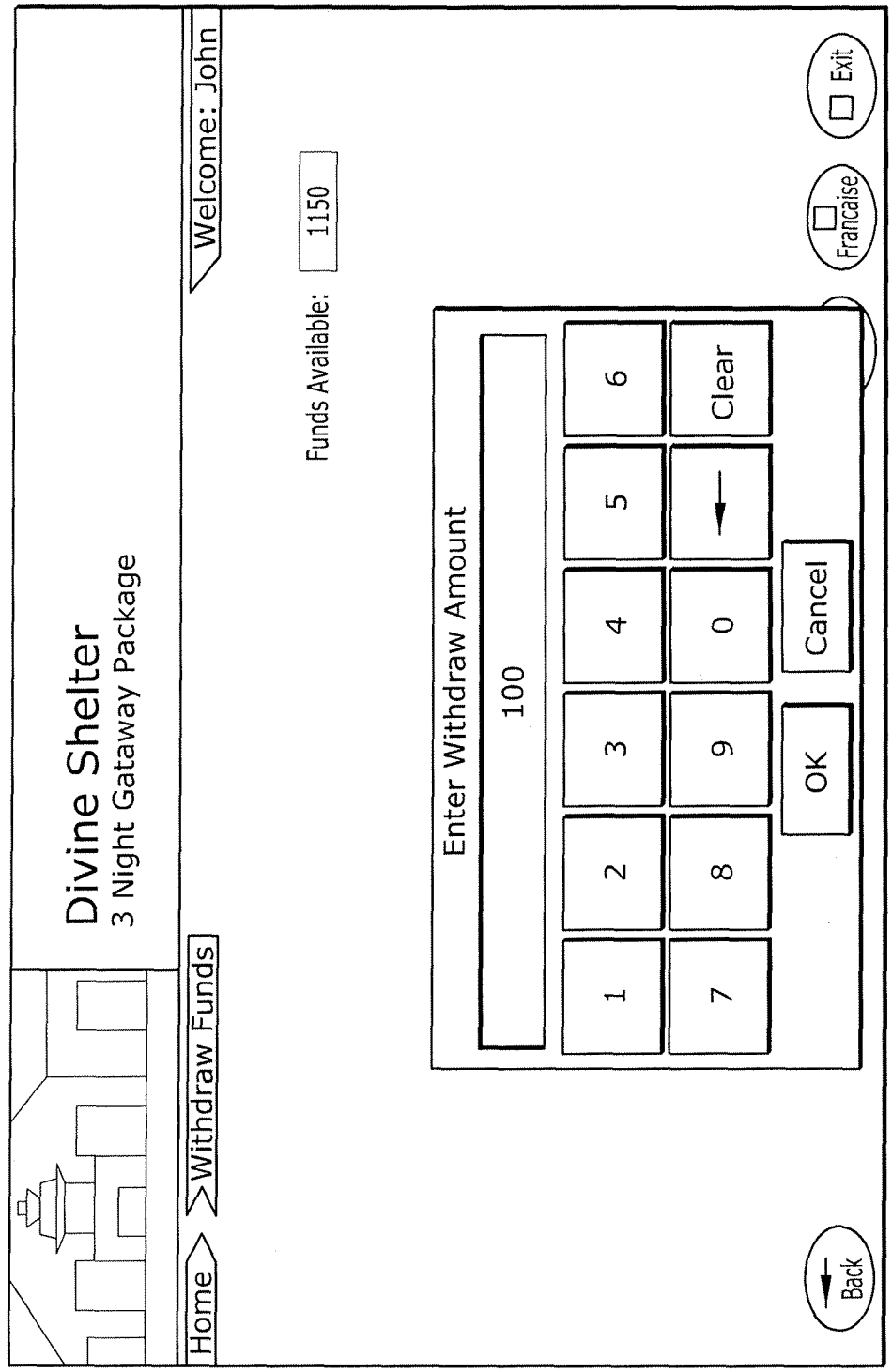
FIG. 14 illustrates Kiosk integration using the Mobile Wallet Application for funding.

Referring now to FIG. 13 and FIG. 14, one embodiment of a kiosk in the Virtual Ticket System is shown. A player may swipe their credit card or debit card to access funds, or insert cash via a bill acceptor. These funding sources may be applied to a mobile wallet using the Virtual Ticket System.

Figure 16:
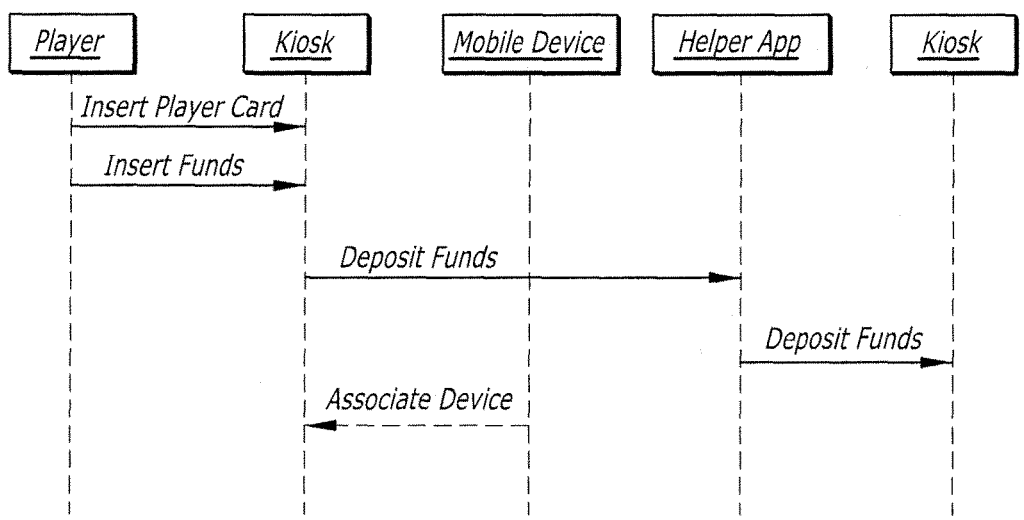
FIG. 16 illustrates a Kiosk Mobile device funding with player card.

To apply funds to a mobile wallet using the Virtual Ticket System, the player must either associate a mobile device 110 or player tracking card with the kiosk. As shown in FIG. 16, to associate a player tracking card with the kiosk, the player simply swipes the card when prompted. Additionally, to associate a mobile device 110 with the kiosk, the kiosk preferably uses a QR/barcode reader. The mobile wallet application has the capability to display a QR code on the display of the mobile device 110. In response to prompting, the player activates the association function of the mobile application and places the mobile device 110 (e.g., smart phone) under the barcode reader.

Figure 15:
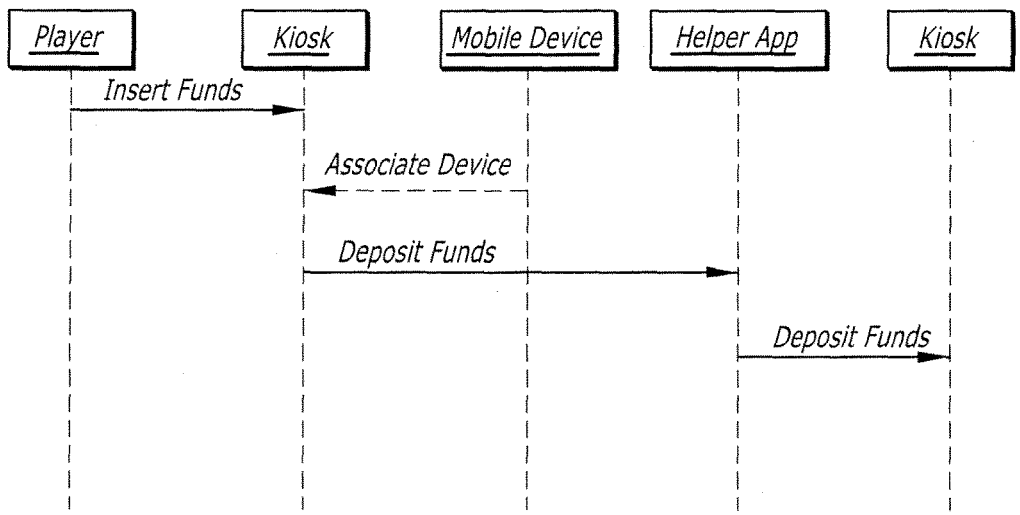
FIG. 15 illustrates a Kiosk Mobile device funding without player card.

As shown in FIG. 15, in such an embodiment, the kiosk application then reads the QR code from the display of the mobile device 110 and uniquely identifies the mobile device, and thus, its mobile wallet account is in the database. In either case, when the association is complete, funds are in the mobile wallet and can be used at an EGM 130 or on a mobile device 110 for game play. In a further embodiment, for mobile device play, the player can choose the initial game or available game suite from the kiosk as well.

Figure 17:
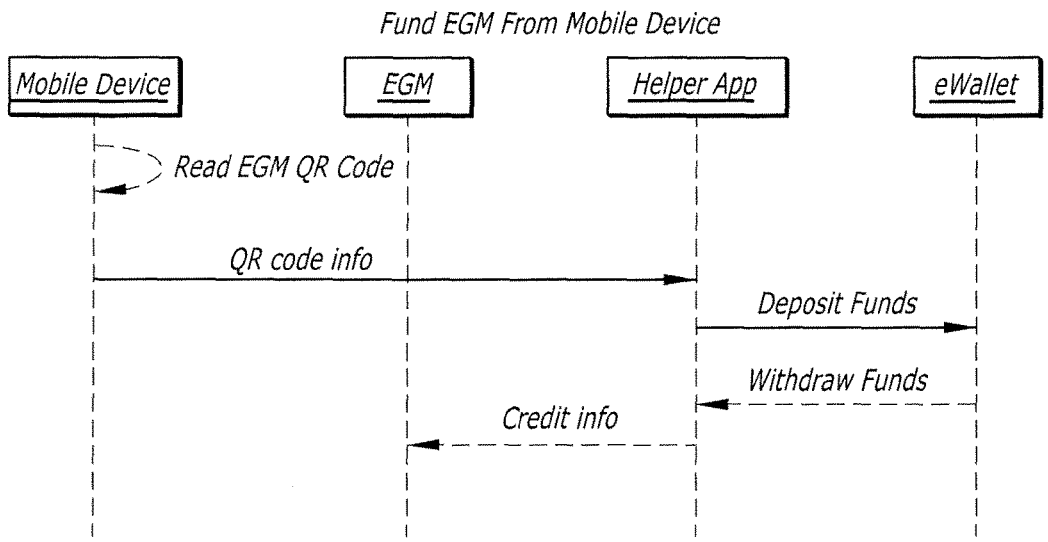
FIG. 17 illustrates an electronic gaming machine receiving funding from a mobile device without using a player card.
Figure 18:
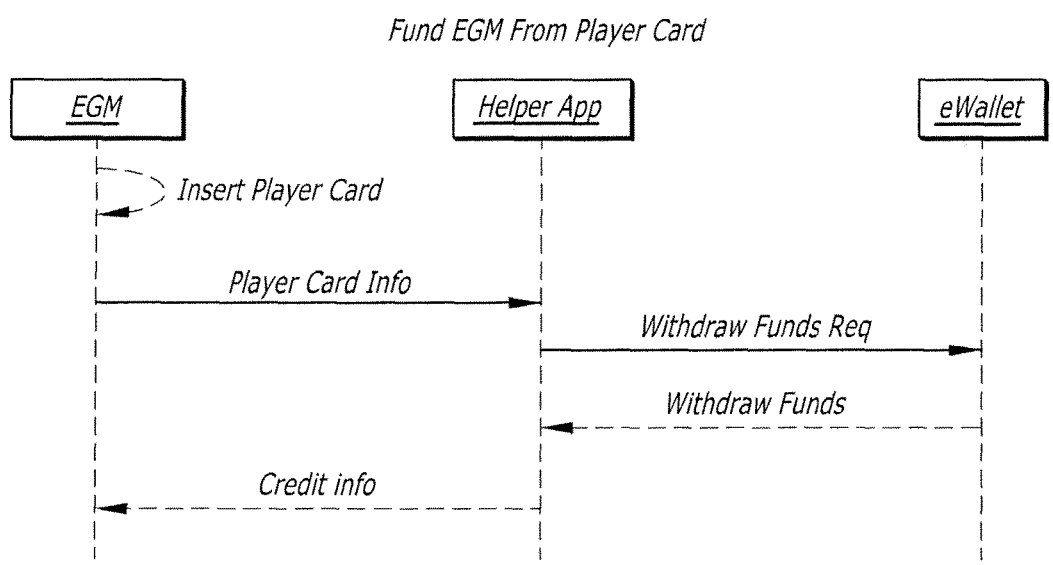
FIG. 18 illustrates an electronic gaming machine receiving funding from a player card.

Funding Game Play at an EGM:

As shown in FIGS. 17 and 18, using the Virtual Ticket System, a player may also fund game play at an EGM 130 using a mobile device 110 or player card. Specifically, FIG. 17 and FIG. 18 each show possible transaction flows. In one of the scenarios shown, a player card is not used, while in the other scenario shown, a player card is in use.

Figure 19:
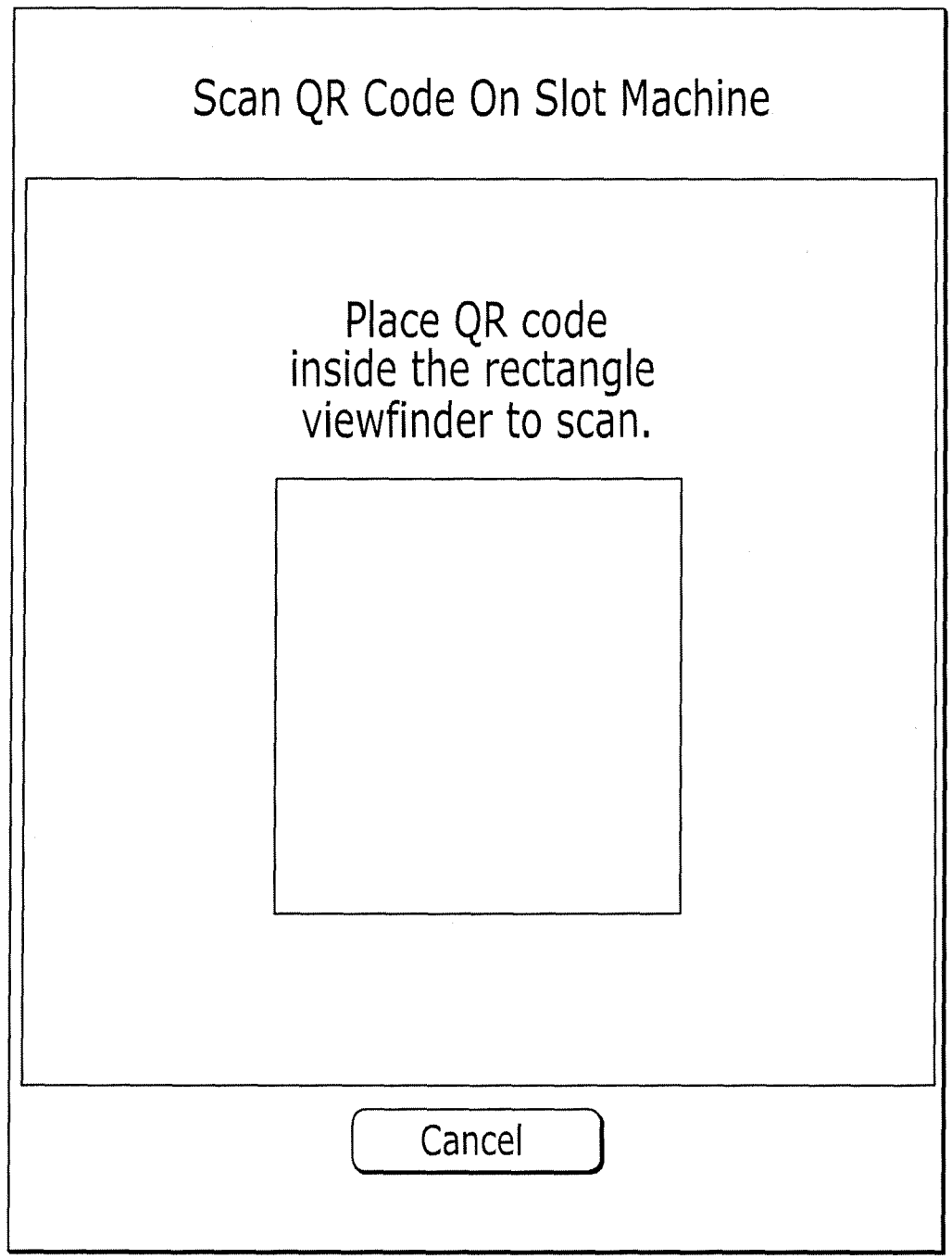
FIG. 19 illustrates a Mobile application to perform association with an electronic gaming machine.
Figure 20:
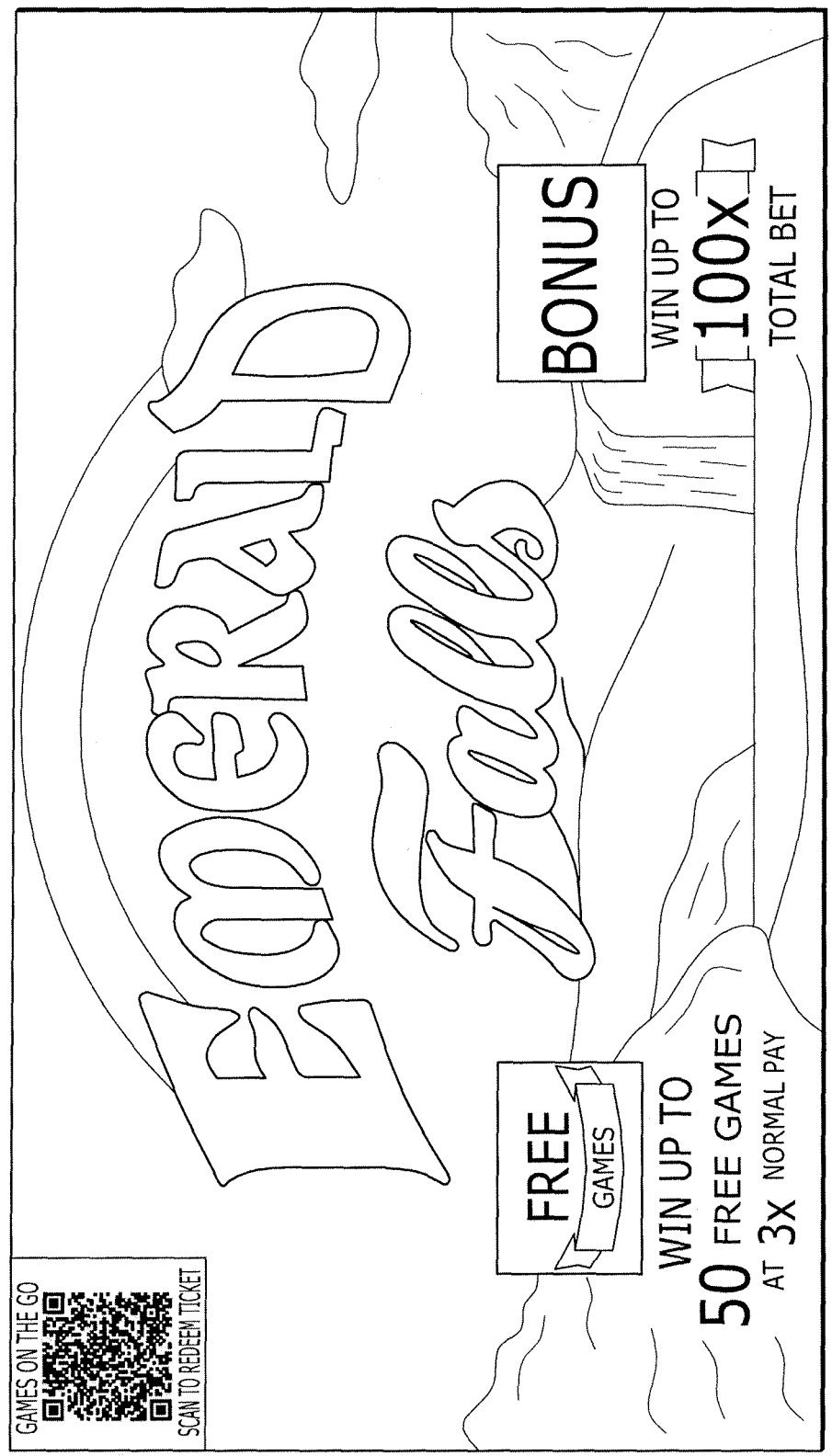
FIG. 20 illustrates an electronic gaming machine artwork with QR code for mobile association.
Figure 21:
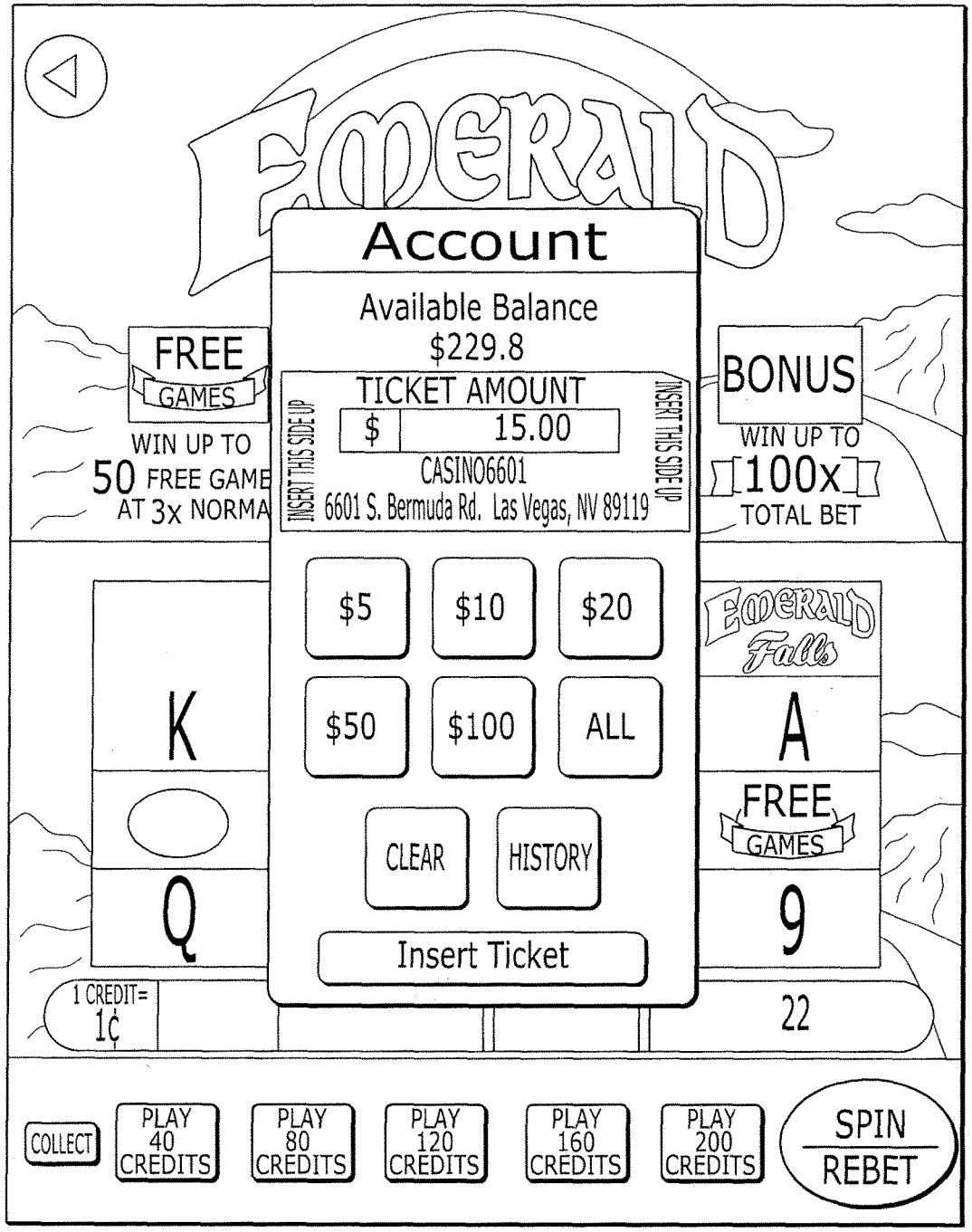
FIG. 21 illustrates a mobile version of game with mobile wallet integration.

In one embodiment of the Virtual Ticket System where a mobile device 110 is being used, the player associates the mobile device 110 with the EGM 130. This is achieved by bringing up an association function of the mobile device 110, as shown in FIG. 19. In this embodiment, the player then points the camera of the mobile device 110 at the EGM 130, which is modified to display a QR code on its artwork as seen in FIG. 20. This QR code uniquely identifies the EGM 130 and enables the mobile wallet helper application to direct the funds being withdrawn to be correctly deposited on the EGM. As shown in FIG. 21, the user interface for this transaction may be presented on the mobile device 110. Conversely, funds won or inserted into the bill acceptor of the EGM 130 may be delivered to the mobile wallet upon cashout, for use on the mobile device 110 or at a kiosk, as described below.

Multi-Platform Game Play:

In some preferred embodiments, a player may switch their game play from an EGM to a mobile device and back again. This type of game transfer between platforms is referred to herein as "Games on the Go." Once a mobile device 110 and an EGM 130 are associated with each other, a gaming session can be moved from one to the other. Additionally, once a mobile device 110 and an EGM 130 are associated with each other, funding also can be moved from one to the other. In one embodiment of the Virtual Ticket System, this association may be preferably performed by the QR code acquisition described above with respect to FIG. 20, or via the insertion of a player tracking card to associate a player tracking account with both the EGM 130 and mobile device 110. In addition to these preferred methods, alternative methods could include manual input of an account name/PIN at the EGM 130 or communication over Bluetooth or NFC between the EGM and the mobile device 110.

Figure 22:
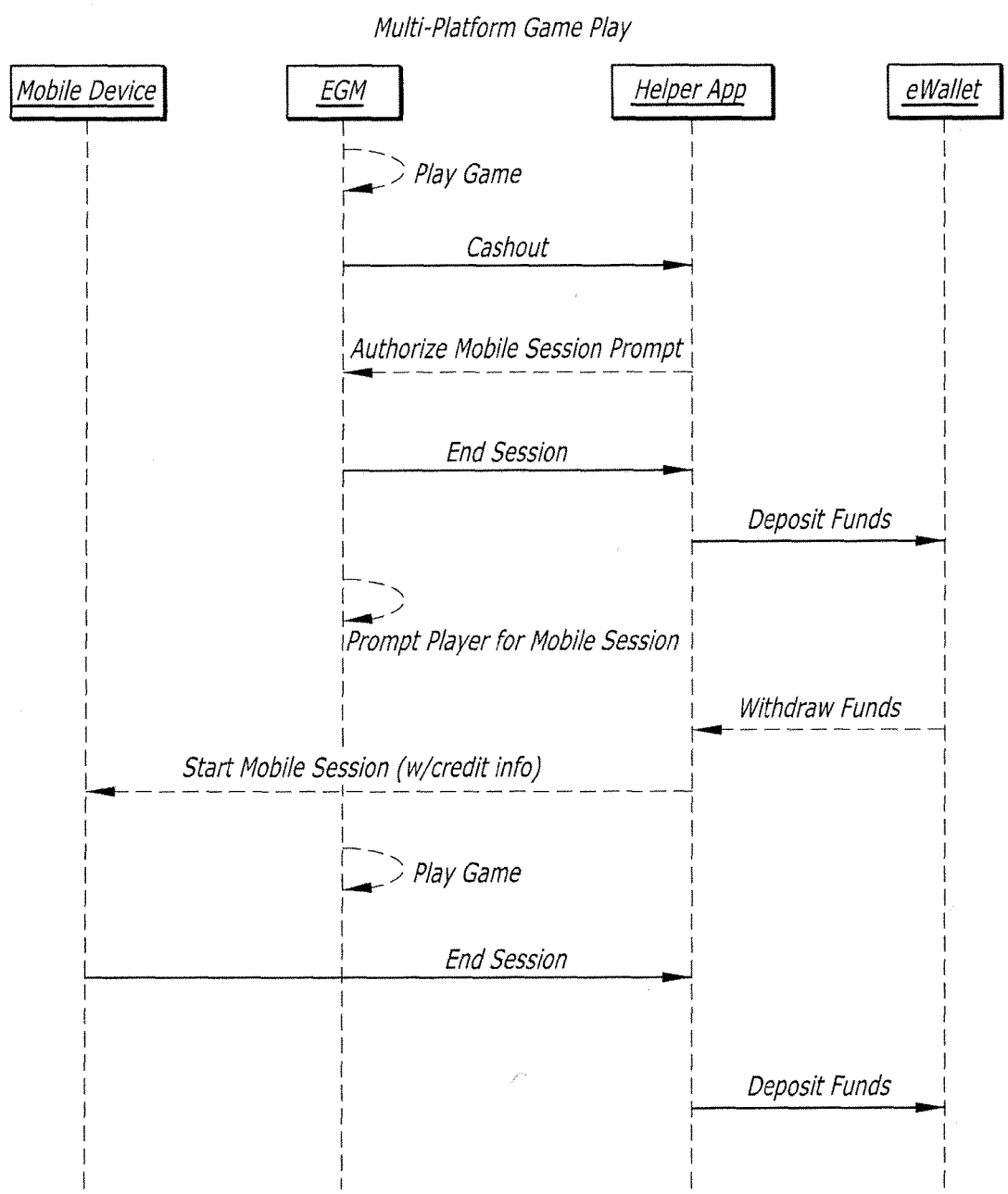
FIG. 22 illustrates an overall process for combined game play between a mobile device and an electronic gaming machine without using a player card.
Figure 23:
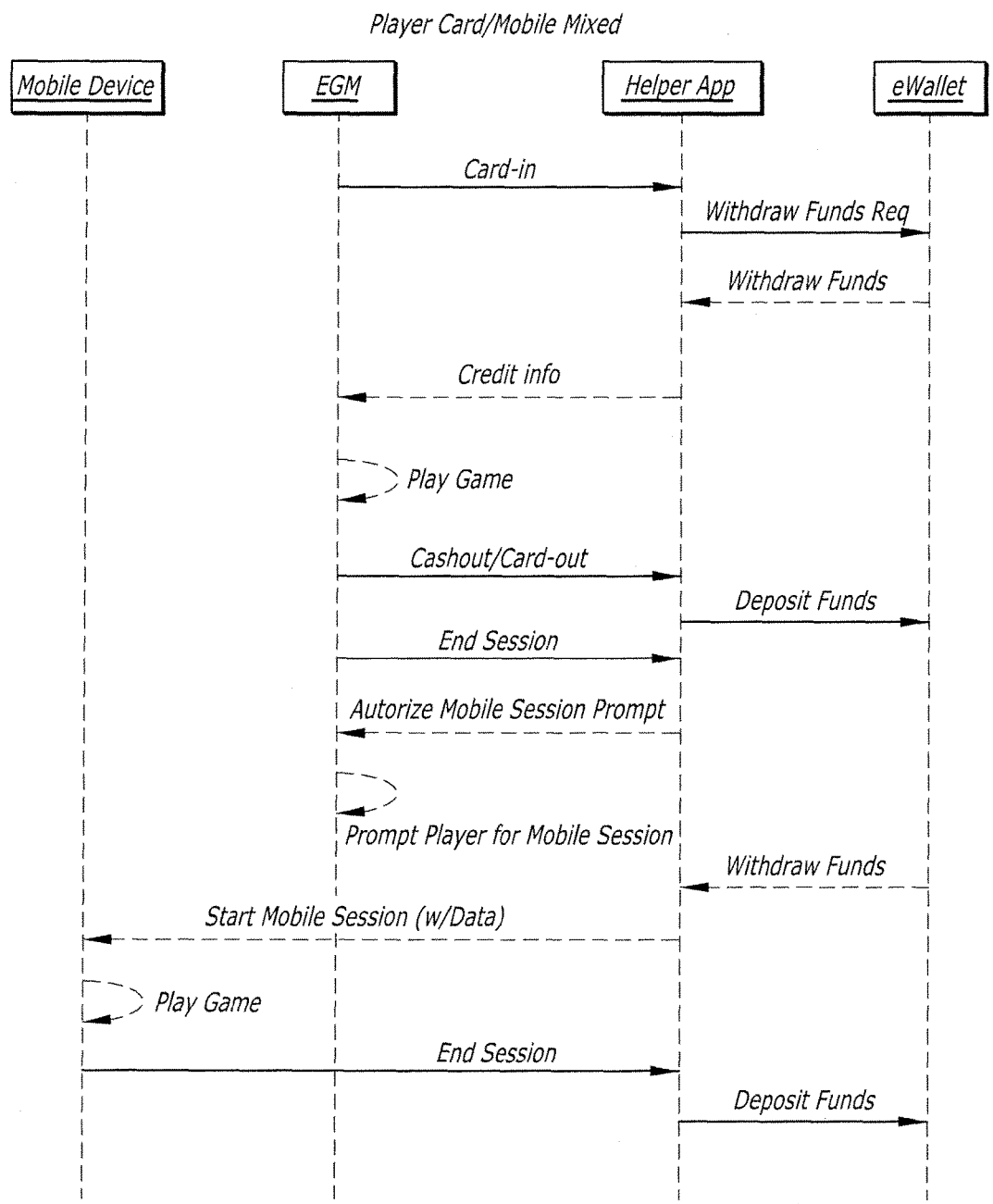
FIG. 23 illustrates an overall process for combined game play between a mobile device and an electronic gaming machine with a player card.

Transactions which may trigger the movement of the session could include a QR scan by the player, which would move the gaming session from a mobile device 110 to the EGM 130. As shown in FIG. 22, pressing the "cash out" button at the EGM 130 would initiate (or prompt) movement of the gaming session from the EGM to the mobile device 110 (i.e., in the opposite direction). As shown in FIG. 23, in the case of a transaction in which a player card is being used, cashing out would also prompt movement (i.e., transfer) of the gaming session.

Figure 24:
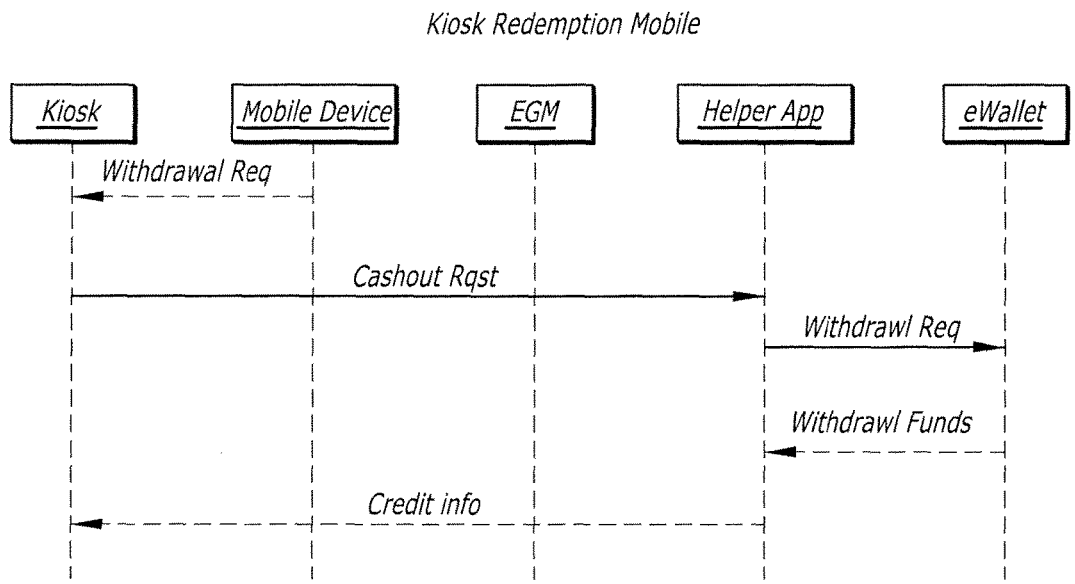
FIG. 24 illustrates a Kiosk redemption embodiment from a mobile device without a player card.
Figure 25:
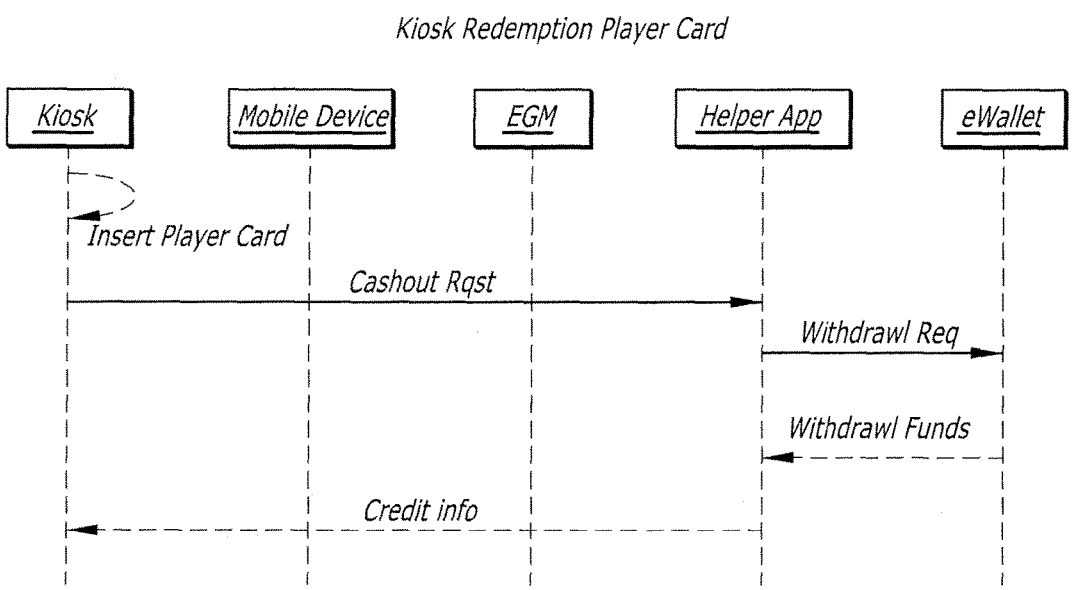
FIG. 25 illustrates a Kiosk redemption embodiment with a player card.

Kiosk Credit Redemption:

As noted above, in some embodiments of the Virtual Ticket System, the kiosk may be used to redeem credits as cash or direct funding into an external (bank/credit card) account. The transaction flows for these embodiments are shown in FIG. 24 and FIG. 25. Specifically, in FIG. 24 the players use their mobile devices 110 to identify the correct mobile wallet account for the kiosk. In one embodiment, the players do this by pressing a "Redeem ticket" button on their mobile device 110. This causes a mobile device 110 to display a QR code which can be scanned by the QR/barcode scanner affixed to the kiosk. Importantly, this transaction corresponds to the redemption process of a conventional physical ticket (which may be redeemed by being scanned by the same scanner).

Alternatively, as shown in FIG. 25, if a player has a player tracking card, the player can insert this card in the kiosk. This enables the kiosk to identify the mobile wallet account and present options to the player for withdrawal of cash.

Physical Ticket Acquisition by a Mobile Device:

An additional feature of the Virtual Ticket System enables a player to convert existing physical tickets into mobile wallet funds by the use of a barcode scanner application built into the mobile application. This scanner application uses the rear camera on the mobile device 110 to read the barcode on the ticket and deposit the funds into the mobile wallet account. The physical ticket can then be discarded.

In one embodiment of the Virtual Ticket System, the system enables players to easily consolidate tickets and also convert tickets into funds even after they have left the casino, which is conventionally difficult. Such funds may be used for online game play, or at a later date in the casino without having to keep possession of physical tickets.

In some embodiments, the Virtual Ticket System provides features that include: (1) integration with the existing ticket printer and bill acceptor infrastructure, (2) handling both player tracked accounts and anonymous players, (3) ease of use for player comfortable with TITO (inserting their phone into a scanner rather than a ticket, similar to the way supermarket self-serve checkouts or boarding pass terminals at airports may work), (4) not requiring extra peripherals at the gaming machine (since association is achieved by display of the QR code on artwork and only a software change is needed), and (5) enabling players to fund a gaming machine from their mobile device or vice versa.

Some embodiments of the Virtual Ticket System include: (1) a smartphone or tablet with a rear facing camera and network connectivity (e.g., Wi-Fi or 3G/4G), (2) QR code technology as the visual encoding of identifiers, and (3) a kiosk with an optical scanner for reading barcodes/QR codes. Moreover, some embodiments of the Virtual Ticket System include structural and/or operational features such as: (1) use of a mobile device as a way of transferring funds between multiple gaming machines or gaming machines and kiosks, (2) conversion of paper tickets into mobile wallet funds, and (3) seamless transfer of funds along with a game session.

Some embodiments of this gaming system, which include a Virtual Ticket System that uses casino printed tickets to play casino on-line games using a mobile device, leverage existing mobile "smart phones." By way of example only, and not by way of limitation, such smart phones include Apple's iPhone series, Google's Droid and Nexus One series, Samsung's Galaxy Series, Palm's Pre series, and RIM's Blackberry series of smart phones. Most, if not all, of these smart phones include a built-in camera that can be controlled by software applications. Accordingly, some embodiments of this gaming system "move" the camera from the gaming machine to a smart phone.

The captured image is also sent up to the CMS via the secure cellular internet connection. As an alternative to the use of secure connections over the internet, a WiFi local network may also be used if it is present in the casino. At the CMS, the image analysis software passes the self-portrait to the facial recognition system.

In addition to the credentials described above, in another aspect of some embodiments, the smart phone itself may be "married" to a particular user. In such embodiments, in every transaction a unique identifier for the phone may also be transmitted. This identifier is set at the time of installation and cannot be changed by the technician. Alternatively, the phone's IMEI (International Mobile Equipment Identity) number or other cellular identifier may be used.

In such embodiments of the disclosed gaming system, smart phones are utilized that include a built in gyroscope, as well as location tracking technology such as a digital compass and a GPS system (Global Positioning System). These features enable the accurate position and orientation of the smart phones and its user to be derived. Additionally, some other embodiments of the disclosed gaming system use object recognition and OCR (Optical character recognition) techniques combined with location/orientation derivation to provide players in casinos easy ways of finding games, progressive jackpots, particular machines, and other players of their choice.

In another aspect of some embodiments, gaming systems are utilized that include mobile gaming capabilities. In such embodiments of the disclosed gaming system, smart phones are utilized that include built in object recognition technologies and OCR (Optical character recognition) techniques combined with location/orientation derivation to provide players in casinos with additional gaming options and opportunities. In one embodiment of a gaming system that includes mobile gaming capabilities, the gaming system leverages the possession by players of smart phones to enable the manufacturer to build profiles of players and target valuable players for promotions of key products of the manufacture.

Continuing, in some embodiments of the gaming system having mobile gaming capabilities, the "Geographic Restrictions" file includes some combination of cell tower identifier, reverse DNS lookup, and GPS address to restrict the eligibility of some bonuses. In another aspect of some embodiments, the "Demographic Restrictions" file includes some bonuses that are available to players in certain demographic groups such as age-ranges. In still another aspect, the "Time Restrictions" field includes bonuses that may be only available at certain times of the week or for a fixed length of time.

Figure 26:
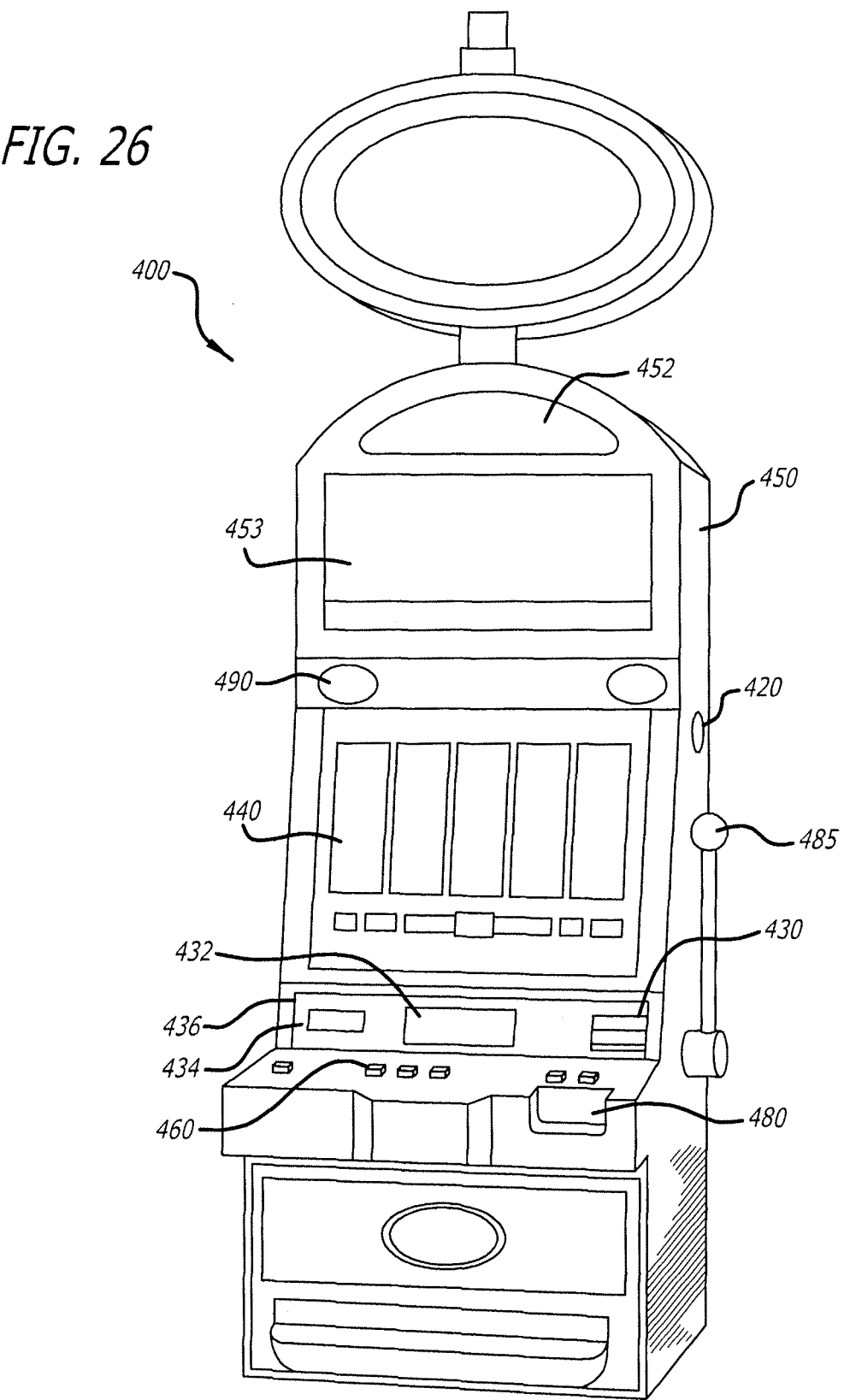
FIG. 26 is a perspective view of a gaming machine in accordance with one or more embodiments.
Figure 27:
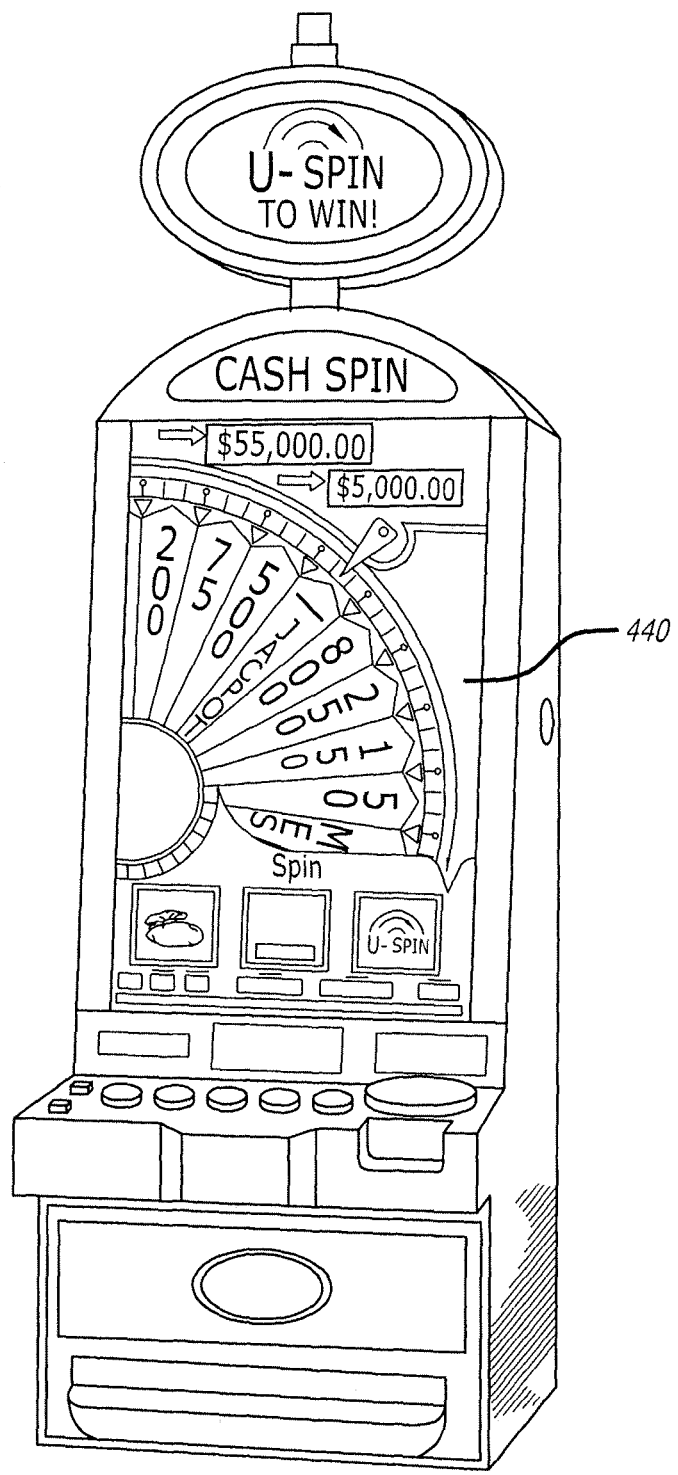
FIG. 27 is a perspective view of another embodiment of a gaming machine.

In accordance with one or more embodiments, FIGS. 26 and 27 illustrate a gaming machine 400 including cabinet housing 420, primary game display 440 upon which a primary game and feature game may be displayed, top box 450 which may display multiple progressives that may be won during play of the primary or feature game, player-activated buttons 460, player tracking panel 436, bill/voucher acceptor 480, and one or more speakers 490. Cabinet housing 420 is a self-standing unit that is generally rectangular in shape and may be manufactured with reinforced steel or other rigid materials which are resistant to tampering and vandalism. Cabinet housing 420 houses a processor, circuitry, and software (not shown) for receiving signals from the player-activated buttons 460, operating the games, and transmitting signals to the respective displays and speakers. Any shaped cabinet may be implemented with any embodiment of gaming machine 400 so long as it provides access to a player for playing a game. For example, cabinet 420 may comprise a slant-top, bar-top, or table-top style cabinet. The operation of gaming machine 400 is described more fully below.

In another aspect of one embodiment, the plurality of player-activated buttons 460 may be used for various functions such as, but not limited to, selecting a wager denomination, selecting a game to be played, selecting a wager amount per game, initiating a game, or cashing out money from gaming machine 400. The Buttons 460 functions to input mechanisms and may include mechanical buttons, electromechanical buttons or touch screen buttons. Optionally, a handle 485 may be rotated by a player to initiate a game.

In other embodiments, buttons 460 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated in its entirety by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand. In other embodiments, a virtual button deck may be used to provide similar capabilities. An example of a virtual button deck is disclosed in U.S. application Ser. No. 11/938,203, entitled, "Game Related Systems, Methods, and Articles That Combine Virtual and Physical Elements," filed on Nov. 9, 2007, which is hereby incorporated in its entirety by reference.

Cabinet housing 420 may optionally include top box 450 which contains "top glass" 452 comprising advertising or payout information related to the game or games available on gaming machine 400. Player tracking panel 436 includes player tracking card reader 434 and player tracking display 432. Voucher printer 430 may be integrated into player tracking panel 436 or installed elsewhere in cabinet housing 420 or top box 450.

Game display 440 presents a game of chance wherein a player receives one or more outcomes from a set of potential outcomes. For example, one such game of chance is a video gaming machine. In other aspects of the invention, gaming machine 400 may present a video or mechanical reel gaming machine, a video keno game, a lottery game, a bingo game, a Class II bingo game, a roulette game, a craps game, a blackjack game, a mechanical or video representation of a primary wheel game or the like.

Mechanical or video/mechanical embodiments may include game displays such as mechanical reels, wheels, or dice as required to present the game to the player. In video/mechanical or pure video embodiments, game display 440 is typically a CRT or a flat-panel display in the form of, but not limited to, liquid crystal, plasma, electroluminescent, vacuum fluorescent, field emission, or any other type of panel display known or developed in the art. Game display 440 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. FIG. 27 illustrates an example of a portrait mode game display 440 having widescreen dimensions in accordance with one embodiment of the invention. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference. Furthermore, as described above, game display 440 may include transparent portions which cover and may interact with displays on mechanical reels, as described in U.S. application Ser. No. 12/113,112, entitled, "MECHANICAL REELS WITH INTERACTIVE DISPLAY," filed on Apr. 30, 2008, which is hereby incorporated in its entirety by reference.

Game display 440 may also present information such as, but not limited to, player information, advertisements and casino promotions, graphic displays, news and sports updates, or may even offer an alternate game. This information may be generated through a host computer networked with gaming machine 400 on its own initiative, or it may be obtained by request of the player using either (1) one or more of the plurality of player-activated buttons 460; (2) the game display itself, if game display 440 comprises a touch screen or similar technology; (3) buttons (not shown) mounted on game display 440 which may permit selections such as those found on an ATM machine, where legends on the screen are associated with respective selecting buttons; or (4) any player input device that offers the required functionality.

Cabinet housing 420 incorporates a single game display 440. However, in alternate embodiments, cabinet housing 420 or top box 450 may house one or more additional displays 453 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 28A:
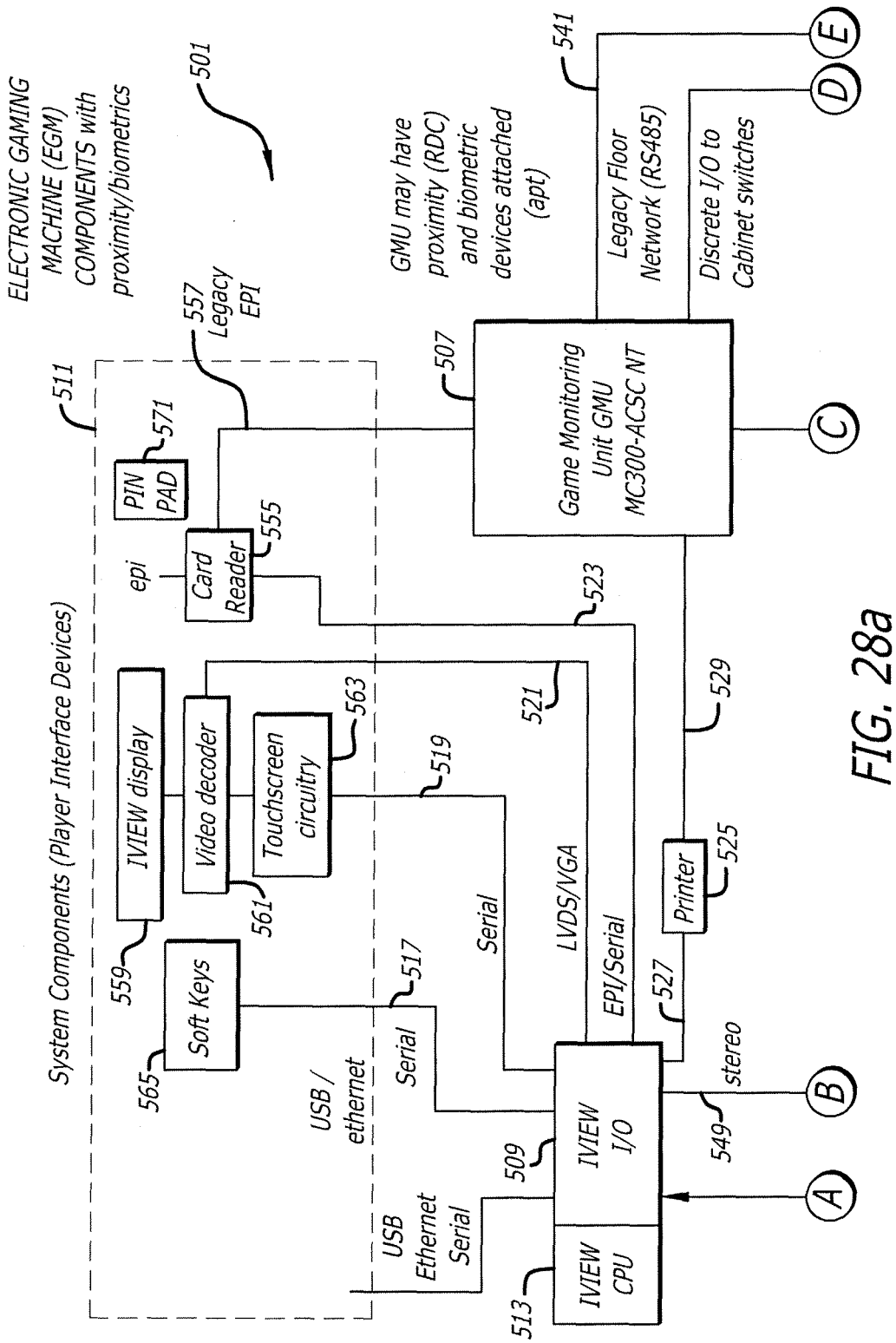
FIGS. 28a and 28b are block diagrams of the physical and logical components of the gaming machine of FIG. 26.
Figure 28B:
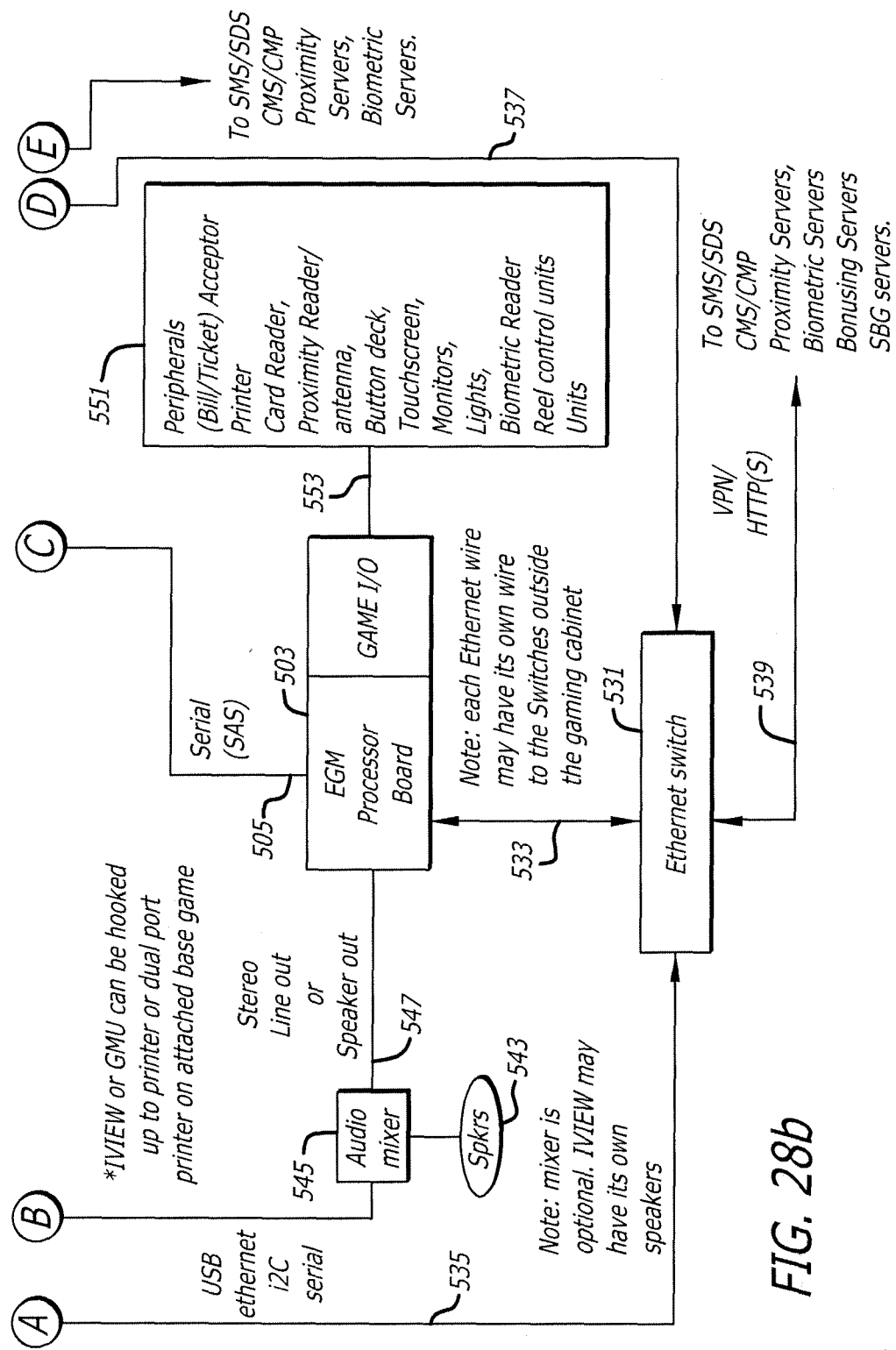

Referring to FIGS. 28a and 28b, electronic gaming machine 501 is shown in accordance with one or more embodiments. Electronic gaming machine 501 includes base game integrated circuit board 503 (EGM Processor Board) connected through serial bus line 505 to game monitoring unit (GMU) 507 (such as a Bally MC300 or ACSC NT), and player interface integrated circuit board (PIB) 509 connected to player interface devices 511 over bus lines 513, 515, 517, 519, 521, 523. Printer 525 is connected to PIB 509 and GMU 507 over bus lines 527, 529. EGM Processor Board 503, PIB 509, and GMU 507 connect to Ethernet switch 531 over bus lines 533, 535, 537. Ethernet switch 531 connects to a slot management system (SMS) and a casino management system (CMS) network over bus line 539. GMU 507 also may connect to the SMS and CMS network over bus line 541. Speakers 543 connect through audio mixer 545 and bus lines 547, 549 to EGM Processor Board 503 and PIB 509. The proximity and biometric devices and circuitry may be installed by upgrading a commercially available PIB 509, such as a Bally iVIEW unit. Coding executed on EGM Processor Board 503, PID 509, and/or GMU 507 may be upgraded to integrate a game having an interactive wheel game as is more fully described herein.

Peripherals 551 connect through bus 553 to EGM Processor Board 503. For example, a bill/ticket acceptor is typically connected to a game input-output board 553 which is, in turn, connected to a conventional central processing unit ("CPU") board 503, such as an Intel Pentium microprocessor mounted on a gaming motherboard. I/O board 553 may be connected to CPU processor board 503 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Processor board 503 executes a game program that causes processor board 503 to play a game. In one embodiment, the game program provides a gaming machine game having an interactive wheel feature game. The various components and included devices may be installed with conventionally and/or commercially available components, devices, and circuitry into a conventionally and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 553 to processor board 503 which, in turn, assigns an appropriate number of credits for play in accordance with the game program. The player may further control the operation of the gaming machine by way of other peripherals 551, for example, to select the amount to wager via electromechanical or touch screen buttons. The game starts in response to the player operating a start mechanism such as a handle or touch screen icon.

The game program includes a random number generator to provide a display of randomly selected indicia on one or more displays. In some embodiments, the random number generator may be physically separate from gaming machine 400. For example, it may be part of a central determination host system which provides random game outcomes to the game program. Thereafter, the player may or may not interact with the game through electromechanical or touch screen buttons to change the displayed indicia. Finally, processor board 503 under control of the game program and OS compares the final display of indicia to a pay table. The set of possible game outcomes may include a subset of outcomes related to the triggering of a feature game. In the event the displayed outcome is a member of this subset, processor board 503, under control of the game program and by way of I/O Board 553, may cause feature game play to be presented on a feature display.

Predetermined payout amounts for certain outcomes, including feature game outcomes, are stored as part of the game program. Such payout amounts are, in response to instructions from processor board 503, provided to the player in the form of coins, credits or currency via I/O board 553 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 507 includes an integrated circuit board, a GMU processor, and memory including coding for network communications, such as the G2S (game-to-system) protocol from the Gaming Standards Association, Las Vegas, Nev., used for system communications over the network. As shown, GMU 507 may connect to card reader 555 through bus 557 and may thereby obtain player card information and transmit the information over the network through bus 541. Gaming activity information may be transferred by the EGM Processor Board 503 to GMU 507 where the information may be translated into a network protocol, such as S2S, for transmission to a server, such as a player tracking server, where information about a player's playing activity may be stored in a designated server database.

PID 509 includes an integrated circuit board, PID processor, and memory which includes an operating system, such as Windows CE, a player interface program which may be executable by the PID processor together with various input/output (I/O) drivers for respective devices which connect to PID 509, such as player interface devices 511, and which may further include various games or game components playable on PID 509 or playable on a connected network server and PID 509, which is operable as the player interface. PID 509 connects to card reader 555 through bus 523, display 559 through video decoder 561 and bus 521, such as an LVDS or VGA bus.

As part of its programming, the PID processor executes coding to drive display 559 and provides messages and information to a player. Touch screen circuitry interactively connects display 559 and video decoder 561 to PID 509, such that a player may input information and cause the information to be transmitted to PID 509 either on the player's initiative or responsive to a query by PID 509. Additionally, soft keys 565 connect through bus 517 to PID 509 and operates together with display 559 to provide information or queries to a player and receive responses or queries from the player. PID 509, in turn, communicates over the CMS/SMS network through Ethernet switch 531 and busses 535, 539 and with respective servers, such as a player tracking server.

Player interface devices 511 are linked into the virtual private network of the system components in gaming machine 501. The system components include the iVIEW processing board and game monitoring unit (GMU) processing board. These system components may connect over a network to the slot management system (such as a commercially-available Bally SDS/SMS) and/or casino management system (such as a commercially-available Bally CMP/CMS).

The GMU system component has a connection to the base game through a serial SAS connection and is connected to various servers using, for example, HTTPs over Ethernet. Through this connection, firmware, media, operating system software, or gaming machine configurations can be downloaded to the system components from the servers. This data is authenticated prior to installation on the system components.

The system components include the iVIEW processing board and game monitoring unit (GMU) processing board. The GMU and iVIEW (or other player tracking unit) can be combined into one like the commercially available Bally GTM iVIEW device. This device may have a video mixing technology to mix the EGM processor's video signals with the iVIEW display onto the top box monitor or any monitor on the gaming device.

Figure 29:
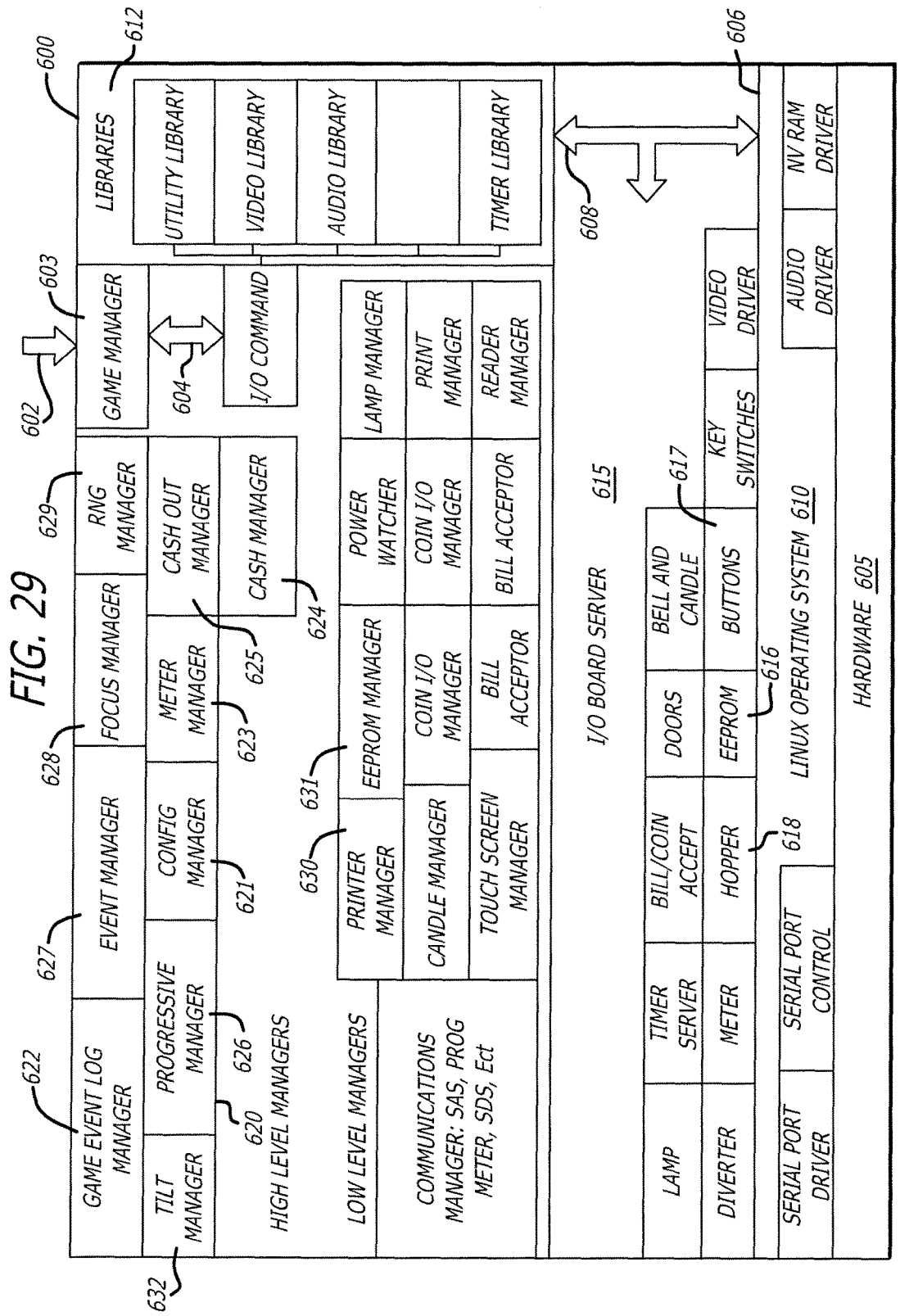
FIG. 29 is a block diagram of the logical components of a gaming kernel in accordance with one or more embodiments of the invention.

In accordance with one or more embodiments, FIG. 29 is a functional block diagram of a gaming kernel 600 of a game program under control of processor board 503, using gaming kernel 600 by calling it into application programming interface (API) 602, which is part of game manager 603. The components of game kernel 600, as shown in FIG. 29, are only illustrative and should not be considered limiting. For example, the number of managers may be changed, additional managers may be added or some managers may be removed without deviating from the scope and spirit of the invention.

As shown in the example, there are three layers: a hardware layer 605; an operating system layer 610, such as, but not limited to, Linux: and a game kernel layer 600 having game manager 603 therein. In one or more embodiments, the use of a standard operating system 610, such as a UNIX-based or Windows-based operating system, allows game developers interfacing to the gaming kernel to use any of a number of standard development tools and environments available for the operating systems. This is in contrast to the use of proprietary, low-level interfaces which may require significant time and engineering investments for each game upgrade, hardware upgrade, or feature upgrade. The game kernel layer 600 executes at the user level of the operating system 610, and itself contains a major component called the I/O Board Server 615. To properly set the bounds of game application software (making integrity checking easier), all game applications interact with gaming kernel 600 using a single API 602 in game manager 603. This enables game applications to make use of a well-defined, consistent interface, as well as making access points to gaming kernel 600 controlled, where overall access is controlled using separate processes.

For example, game manager 603 parses an incoming command stream and, when a command dealing with I/O comes in (arrow 604), the command is sent to an applicable library routine 612. Library routine 612 decides what it needs from a device, and sends commands to I/O Board Server 615 (see arrow 608). A few specific drivers remain in operating system 610's kernel, shown as those below line 606. These are built-in, primitive, or privileged drivers that are (i) general, (ii) kept to a minimum, and (iii) easier to leave than extract. In such cases, the low-level communications are handled within operating system 610, and the contents are passed to library routines 612.

Thus, in a few cases, library routines may interact with drivers inside operating system 610, which is why arrow 608 is shown as having three directions (between library utilities 612 and I/O Board Server 615, or between library utilities 612 and certain drivers in operating system 610). No matter which path is taken, the logic needed to work with each device is coded into modules in the user layer of the diagram. Operating system 610 is kept as simple, stripped down, and common across as many hardware platforms as possible. The library utilities and user-level drivers change as dictated by the game cabinet or game machine in which it will run. Thus, each game cabinet or game machine may have an industry standard processor board 505 connected to a unique, relatively dumb, and as inexpensive as possible I/O adapter board 540, plus a gaming kernel 600 which will have the game-machine-unique library routines and I/O Board Server 615 components needed to enable game applications to interact with the gaming machine cabinet. Note that these differences are invisible to the game application software with the exception of certain functional differences (i.e., if a gaming cabinet has stereo sound, the game application will be able to make use of API 602 to use the capability over that of a cabinet having traditional monaural sound).

Game manager 603 provides an interface into game kernel 600, providing consistent, predictable, and backwards-compatible calling methods, syntax, and capabilities by way of game application API 602. This enables the game developer to be free of dealing directly with the hardware, including the freedom to not have to deal with low-level drivers as well as the freedom to not have to program lower-level managers 630, although lower-level managers 630 may be accessible through game manager 603's interface 602 if a programmer has the need. In addition to the freedom derived from not having to deal with the hardware level drivers and the freedom of having consistent, callable, object-oriented interfaces to software managers of those components (drivers), game manager 603 provides access to a set of upper level managers 620 also having the advantages of consistent callable, object-oriented interfaces, and further providing the types and kinds of base functionality required in casino-type games. Game manager 603, providing all the advantages of its consistent and richly functional interface 602 as supported by the rest of game kernel 600, thus provides a game developer with a multitude of advantages.

Game manager 603 may have several objects within itself, including an initialization object (not shown). The initialization object performs the initialization of the entire game machine, including other objects, after game manager 603 has started its internal objects and servers in appropriate order. In order to carry out this function, the kernel's configuration manager 621 is among the first objects to be started. The configuration manager 621 has the data needed to initialize and correctly configure other objects or servers.

The upper level managers 620 of game kernel 600 may include game event log manager 622 which provides, at the least, a logging or logger base class, enabling other logging objects to be derived from this base object. The logger object is a generic logger. Otherwise stated, the logger object is not aware of the contents of logged messages and events. The log manager's (622) job is to log events in non-volatile event log space. The size of the space may be fixed, although the size of the logged event is typically not. When the event space or log space fills up, one embodiment deletes the oldest logged event (each logged event has a time/date stamp, as well as other needed information such as length), providing space to record the new event. In this embodiment, the most recent events are found in the log space, regardless of their relative importance. Further provided is the capability to read the stored logs for event review.

In accordance with one embodiment, meter manager 623 manages the various meters embodied in the game kernel 600. This includes the accounting information for the game machine and game play. There are hard meters (counters) and soft meters. The soft meters may be stored in non-volatile storage such as non-volatile, battery-backed RAM to prevent loss. Further, a backup copy of the soft meters may be stored in a separate non-volatile storage such as EEPROM. In one embodiment, meter manager 623 receives its initialization data for the meters, during startup, from configuration manager 621. While running, the cash-in (624) and cash-out (625) managers call the meter manager's (623) update functions to update the meters. Meter manager 623 will, on occasion, create backup copies of the soft meters by storing the soft meters' readings in EEPROM. This is accomplished by calling and using EEPROM manager 631.

In accordance with still other embodiments, progressive manager 626 manages progressive games playable from the game machine. Event manager 627 is generic, like log manager 622, and is used to manage various gaming machine events. Focus manager 628 correlates which process has control of various focus items. Tilt manager 632 is an object that receives a list of errors (if any) from configuration manager 621 at initialization, and during game play from processes, managers, drivers, and the like, that may generate errors. A random number generator manager 629 is provided to allow easy programming access to a random number generator (RNG), as an (RNG) is required in virtually all casino-style (gambling) games. The RNG manager 629 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 625 has the responsibility of configuring and managing monetary output devices. During initialization, cash out manager 625, using data from configuration manager 621, sets the cash-out devices correctly and selects any selectable cash-out denominations. During play, a game application may post a cash-out event through the event manager 627 (the same way all events are handled), and using a callback posted by cash-out manager 625, and cash-out manager 625 is informed of the event. Cash-out manager 625 updates the credit object, updates its state in non-volatile memory, and sends an appropriate control message to the device manager that corresponds to the dispensing device. As the device dispenses dispensable media, there typically are event messages being sent back and forth between the device and cash-out manager 625 until the dispensing finishes. After the dispensing finishes, the cash-out manager 625, having updated the credit manager and any other game state (such as some associated with meter manager 623) that needs to be updated for this set of actions, sends a cash-out completion event to event manager 627 and to the game application thereby. The cash-in manager 624 functions similarly to cash-out manager 625, addressing requirements for controlling, interfacing, and managing actions associated with cashing-in events, cash in devices, and associated meters and crediting.

In a further example, in accordance with one or more embodiments, I/O server 615 may write data to the gaming machine EEPROM memory, which is located in the gaming machine cabinet and holds meter storage that must be kept even in the event of power failure. Game manager 603 calls the I/O library functions to write data to the EEPROM. The I/O server 615 receives the request and starts a low priority EEPROM thread 616 within I/O server 615 to write the data. This thread uses a sequence of an 8-bit command, and data writes to the EEPROM device to write the appropriate data in the proper location within the device. Any errors detected are sent as IPC messages to game manager 603. Preferably, all of this processing is asynchronously performed.

In accordance with one embodiment, button module 617 within I/O server 615, polls (or is sent) the state of buttons every two milliseconds. These inputs are debounced by keeping a history of input samples. Certain sequences of samples are required to detect a button was pressed, in which case the I/O server 615 sends an inter-process communication event to game manager 603 that a button was pressed or released. In some embodiments, the gaming machine may have intelligently distributed I/O which debounces the buttons, in which case button module 617 may be able to communicate with the remote intelligent button processor to retrieve the button events and simply relay them to game manager 603 via IPC messages. In still another embodiment, the I/O library may be used for pay-out requests from the game application. For example, hopper module 618 must start the hopper motor, constantly monitoring the coin sensing lines of the hopper, debounce them, and send an IPC message to the game manager 603 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional application are both fully incorporated herein by explicit reference.

Figure 30A:
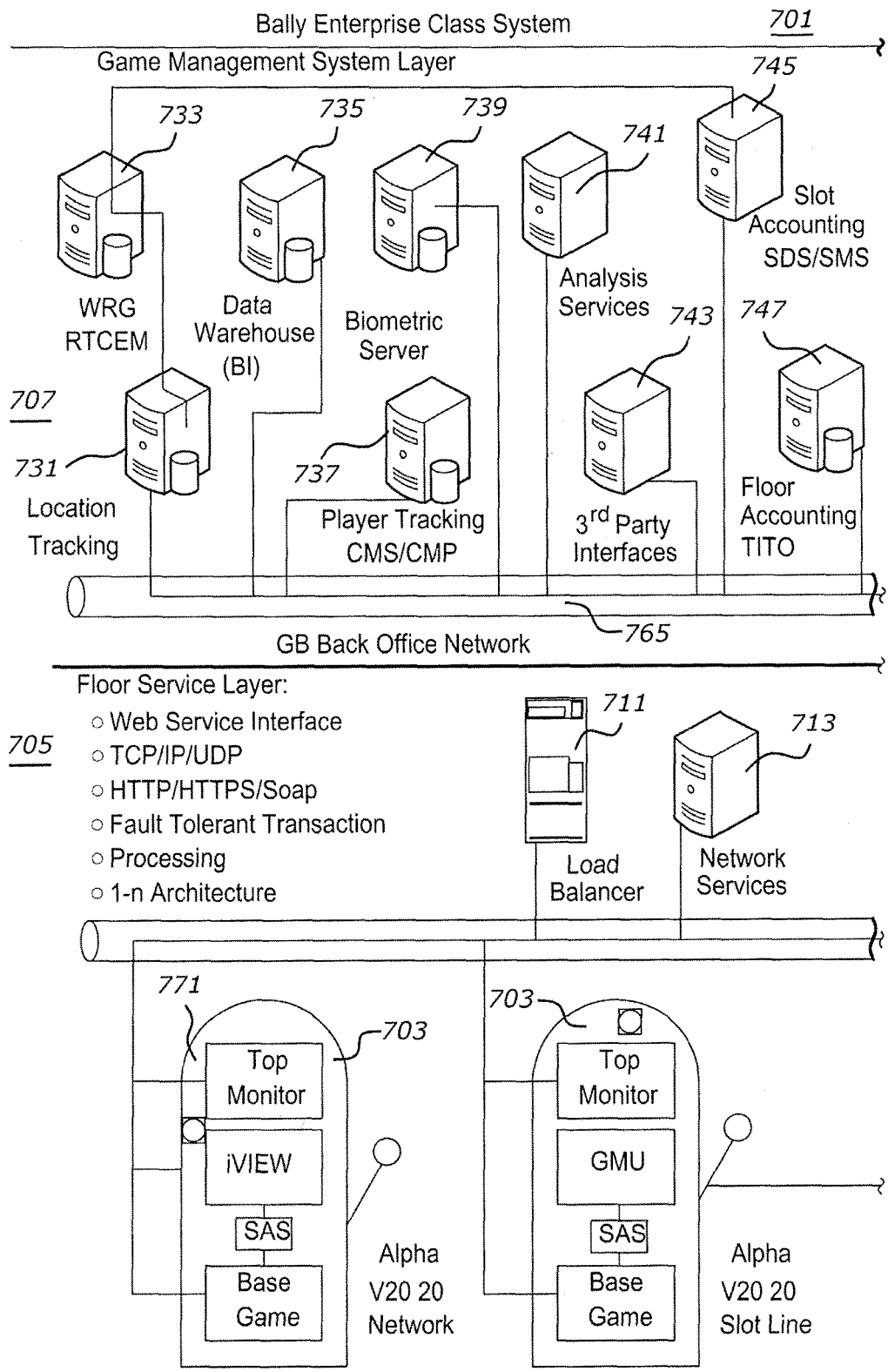
FIGS. 30a and 30b are schematic block diagrams showing the hardware elements of a networked gaming system in accordance with one or more embodiments.
Figure 30B:
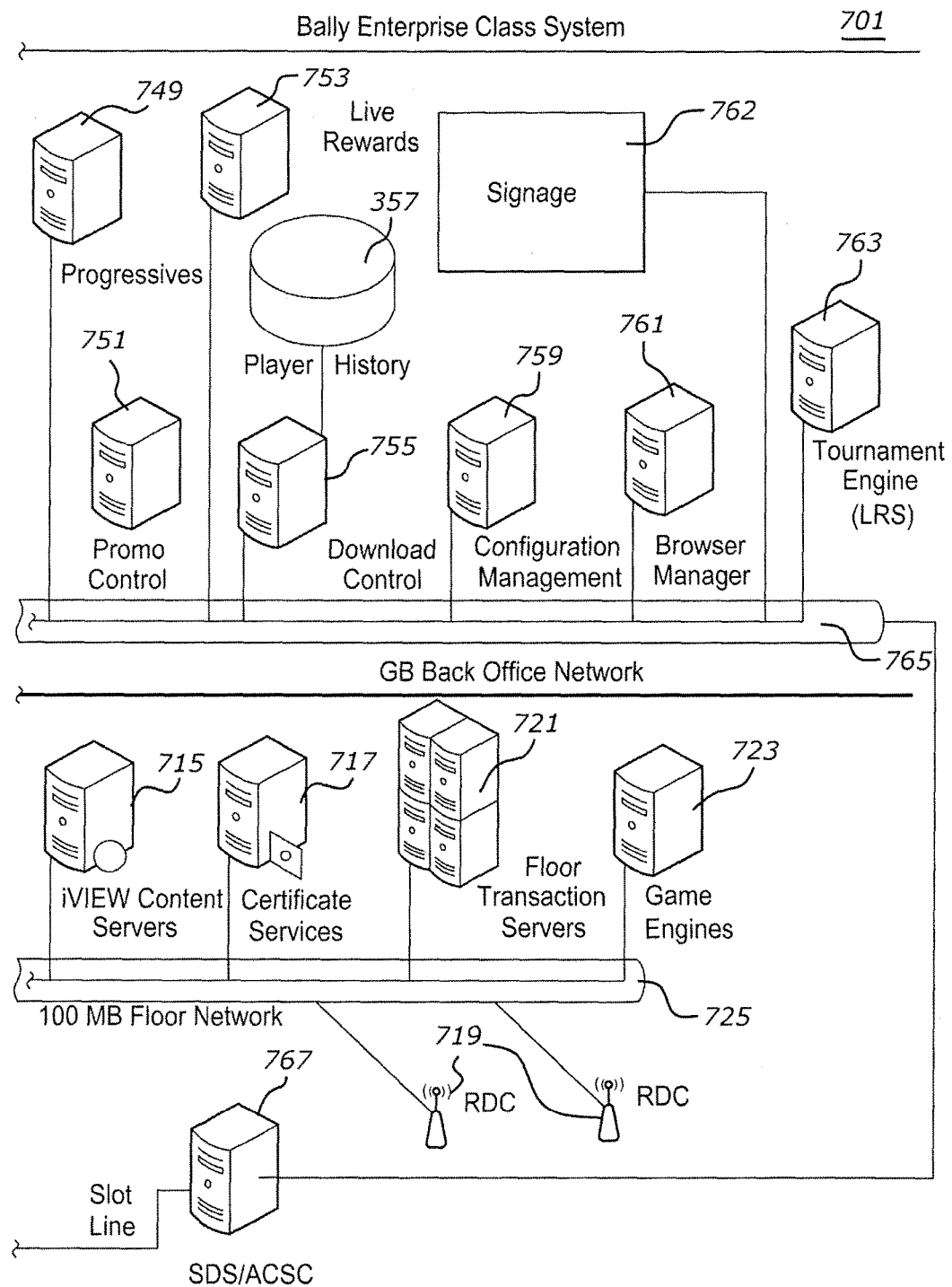

Referring to FIGS. 30a and 30b, enterprise gaming system 701 is shown in accordance with one or more embodiments. Enterprise gaming system 701 may include one casino or multiple locations and generally includes a network of gaming machines 703, floor management system (SMS) 705, and casino management system (CMS) 707. SMS 705 may include load balancer 711, network services servers 713, player interface (iVIEW) content servers 715, certificate services server 717, floor radio dispatch receiver/transmitters (RDC) 719, floor transaction servers 721 and game engines 723, each of which may connect over network bus 725 to gaming machines 703. CMS 707 may include location tracking server 731, WRG RTCEM server 733, data warehouse server 735, player tracking server 737, biometric server 739, analysis services server 741, third party interface server 743, slot accounting server 745, floor accounting server 747, progressives server 749, promo control server 751, bonus game (such as Bally Live Rewards) server 753, download control server 755, player history database 757, configuration management server 759, browser manager 761, tournament engine server 763 connecting through bus 765 to server host 767 and gaming machines 703.

The various servers and gaming machines 703 may connect to the network with various conventional network connections (such as, for example, USB, serial, parallel, RS485, and Ethernet). Additional servers which may be incorporated with CMS 707 include a responsible gaming limit server (not shown), advertisement server (not shown), and a control station server (not shown) where an operator or authorized personnel may select options and input new programming to adjust each of the respective servers and gaming machines 703. SMS 705 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon, and the nature of databases is maintained and utilized in performing their respective functions.

Gaming machines 703 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 707 and/or SMS 305 servers and devices, firmware, media, operating systems, and configurations may be downloaded to the system components of respective gaming machines for upgrading or managing floor content and offerings in accordance with operator selections or automatically depending upon CMS 707 and SMS 705 master programming. The data and programming updates to gaming machines 703 are authenticated using conventional techniques prior to installation on the system components.

In various embodiments, any of the gaming machines 703 may be a mechanical reel spinning gaming machine, video gaming machine, video poker machine, video bingo machine, keno machine, or a gaming machine offering one or more of the above-described games including an interactive wheel feature. Alternately, gaming machines 703 may provide a game with an accumulation-style feature as one of a set of multiple primary games selected for play by a random number generator, as described above. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under the control of a group game server are disclosed in U.S. application Ser. No. 11/938,079, entitled "Networked System and Method for Group Gaming," filed on Nov. 9, 2007, which is hereby incorporated by reference in its entirety for all purposes.

Those skilled in the art will readily recognize various modifications and changes that may be made to the claimed invention without following the example embodiments and applications illustrated and described herein, and without departing from the true spirit and scope of the claimed invention.

What is claimed is:

1. A method for enabling an un-carded player to use tickets printed at a casino when the un-carded player wants to play games in an on-line casino associated with the land-based casino using a virtual ticket system, the method comprising:
   installing a mobile application for the virtual ticket system on a player's mobile device;

registering the un-carded player with the virtual ticket system using a mobile number of the mobile device;
sending a validation key to the mobile number to validate the mobile device;
enabling the un-carded player to plays a game on a gaming machine at the land-based casino without having a player account at the casino;
after the player has completed game play in the land-based casino, providing the player with an opportunity to create an electronic ticket that is usable in the on-line casino;
mapping a ticket number of the electronic ticket and a mobile number recorded in a database when the electronic ticket is created;
validating, using the virtual ticket system, a ticket funding source of the electronic ticket that is external to the casino by comparing the mobile phone number for the electronic ticket in the database; and
enabling the un-carded player to engage in game play in the on-line casino using the player's mobile device or a desktop computer platform.

2. The method of claim 1, wherein the mobile device is a smart phone, tablet computer, or personal digital assistant.

3. The method of claim 1, wherein the mobile number of the mobile device is a telephone number of the mobile device.

4. The method of claim 1, further comprising: scanning and uploading information from a physical ticket to create an electronic ticket on the player's mobile device.

5. The method of claim 1, wherein sending a validation key to the mobile number to validate the mobile device comprises using a Short Message Service (SMS) to send a validation code to the mobile device.

6. The method of claim 5, wherein the SMS code validation defends against automated and/or brute-force cyber-security attacks, thereby ensuring that invalid tickets are not improperly scanned and uploaded.

7. The method of claim 1, wherein an electronic ticket is created using a camera of a player's mobile device, wherein the player opens the mobile application and scans a physical ticket, and wherein the mobile application interprets a ticket image and reads a bar code and/or a QR code.

8. The method of claim 1, wherein an electronic ticket is created using a wireless ticket transfer system instead of printing and scanning a physical ticket, and wherein the player reads the ticket into the mobile device using a wireless communication with the gaming machine.

9. The method of claim 8, wherein the wireless communication includes NFC, RFID, Bluetooth, or combinations thereof.

10. The method of claim 1, wherein an electronic ticket is created using a password protected ticket, wherein the electronic ticket employ a password/personal identification number (PIN)-type of protection in which the electronic ticket requests a PIN number of a player to authorize a ticket amount to be uploaded into the mobile application.

11. The method of claim 1, wherein funds in an electronic ticket that were awarded to a player from on-line casino game play may be used by the player to fund land-based casino game play.

12. The method of claim 1, wherein a ticket number is printed with a bar code.

13. The method of claim 1, wherein, a ticket number is printed with a QR code.

14. The method of claim 1, further comprising a wireless network selected from the group consisting of 4G (4$^{th}$ Generation) LTE (Long Term Evolution), Global System for Mobile Communications (GSM), General Packet Radio Service (GPRS), Code Division Multiple Access (CDMA), Time Division Multiple Access (TDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN).

15. The method of claim 1, wherein the virtual ticket system employs a CAPTCHA (Completely Automated Public Turing test to tell Computers and Humans Apart) system to enable security of ticket creation and redemption.

16. The method of claim 1, further comprising preventing duplicate redemption of electronic tickets by sending details associated with an electronic ticket along with the mobile number of the mobile device.

17. The method of claim 1, wherein the virtual ticket system stores a ticket number along with the phone number of the mobile device.

18. The method of claim 1, wherein the virtual ticket system maintains a database of electronic tickets along with associated mobile numbers.

19. The method of claim 18, further comprising ensuring that multiple mobile device cannot have a copy of a same ticket for redemption, using the database, by verifying that there is only one association between a ticket number and a mobile number.

20. The method of claim 1, further comprising: enabling a player to transfer money to an online profile when the player engages the on-line casino.

21. The method of claim 1, further comprising: providing an interface on a mobile gaming platform of the on-line casino to read an electronic ticket when the player engages the on-line casino on a mobile device.

22. The method of claim 21, wherein the interface is a wireless interface that includes Bluetooth, Wi-Fi, NFC (Near Field Communication), or combinations thereof.

23. The method of claim 1, further comprising: providing an interface on a desktop gaming platform of the on-line casino to read an electronic ticket when the player engages the on-line casino on a desktop computer platform.

24. The method of claim 1, further comprising: authenticating an electronic ticket by checking a mapping between a ticket number and a mobile number recorded when the electronic ticket was created on the mobile device.

25. The method of claim 1, wherein after the virtual ticket system validates an electronic ticket, the virtual ticket system transfers an amount on the electronic ticket to a player's on-line profile, which makes on-line casino games available to the player.

26. The method of claim 1, wherein the virtual ticket system implements a geographical fencing technique to validate the geo-location player that is attempting to access an on-line casino game.

27. The method of claim 1, wherein an electronic ticket on a mobile device is redeemable at a gaming machine that includes an interface to read the electronic ticket from the mobile device.

28. The method of claim 1, wherein electronic ticket details are sent as an SMS, e-mail, or a password-protected web link.

29. The method of claim 1, wherein an electronic ticket is used as a gift from a casino to player or from a player to a friend.

30. A method of enabling an un-carded player to use tickets printed at a casino when the un-carded player wants to play in the casino's online games using a virtual ticket system, the method comprising:

redirecting an un-carded player to a user interface of the virtual ticket system when the un-carded player submits a ticket using a mobile gaming platform or a desktop computer platform;

sending actions from the user interface to a mobile application that enables the un-carded player to submit a ticket by scanning a physical ticket, uploading a ticket image, providing a ticket number, or receiving a ticket via Wi-Fi from a gaming machine, mobile gaming platform, or desktop computer platform;

receiving ticket information from an electronic ticket;

mapping a ticket number of the electronic ticket and a mobile number recorded in a database when the electronic ticket is created;

validating the electronic ticket in an internal database using the associated ticket information;

if the electronic ticket is password protected, prompting the un-carded player to provide a password;

communicating with the virtual ticket system to confirm ticket validity;

validating, using the virtual ticket system, a ticket funding source of the electronic ticket that is external to the casino by comparing the mobile phone number for the electronic ticket in the database; and transferring a redeemed amount to an on-line gaming platform of the casino and enabling the un-carded player to engage in game play in the on-line gaming platform of the casino using the player's mobile device or a desktop computer platform.

\* \* \* \* \*